US009769799B2

(12) United States Patent
Hoshino et al.

(10) Patent No.: US 9,769,799 B2
(45) Date of Patent: *Sep. 19, 2017

(54) WIRELESS COMMUNICATION APPARATUS AND WIRELESS COMMUNICATION METHOD

(71) Applicant: Sun Patent Trust, New York, NY (US)

(72) Inventors: Masayuki Hoshino, Kanagawa (JP); Akihiko Nishio, Kanagawa (JP); Seigo Nakao, Kanagawa (JP); Daichi Imamura, Beijing (CN); Yasuaki Yuda, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/167,691

(22) Filed: May 27, 2016

(65) Prior Publication Data

US 2016/0278047 A1    Sep. 22, 2016

Related U.S. Application Data

(63) Continuation of application No. 14/573,901, filed on Dec. 17, 2014, now Pat. No. 9,380,564, which is a (Continued)

(30) Foreign Application Priority Data

Jun. 2, 2009   (JP) ................................ 2009-133133
Nov. 5, 2009   (JP) ................................ 2009-254160
Feb. 15, 2010  (JP) ................................ 2010-030237

(51) Int. Cl.
  *H04W 72/04*   (2009.01)
  *H04W 24/10*   (2009.01)
  (Continued)

(52) U.S. Cl.
  CPC .......... *H04W 72/04* (2013.01); *H04B 7/0626* (2013.01); *H04B 17/0085* (2013.01);
  (Continued)

(58) Field of Classification Search
  CPC .. H04W 72/04; H04W 24/10; H04W 72/1268
  (Continued)

(56) References Cited

U.S. PATENT DOCUMENTS 8,116,779 B2   2/2012   Iwamura et al.
8,213,329 B2   7/2012   Ishii
(Continued)

FOREIGN PATENT DOCUMENTS

JP   2008-054125 A        3/2008
JP   WO2008105422   *   9/2008   .............. H04J 11/00
(Continued)

OTHER PUBLICATIONS

3GPP TS 36.213 V8.7.0, 3$^{rd}$ Generation Partnership Project; Technical Specification Group Radio Access Network; Evolved Universal Terrestrial Radio Access (E-UTRA); Physical layer procedures (Release 8), Technical Specification, May 2009, 82 pages.
(Continued)

*Primary Examiner* — Ronald B Abelson
(74) *Attorney, Agent, or Firm* — Seed Intellectual Property Law Group LLP

(57) ABSTRACT

To suppress concentration of channel quality information requests and reports in a case of discontinuously transmitting reference signals at specific resources in a time domain, and thereby preventing degradation in throughput. A transmission apparatus transmits an instruction of CSI request distributed for each reception apparatus in a subframe concurrently with or earlier than a reference signal CSI-RS to each of reception apparatuses. Each of the reception apparatuses detects the CSI request from the transmission appa-
(Continued)

ratus and calculates CSI from a channel estimation value of CSI-RS received thereafter. Then, the reception apparatus identifies CSI report subframe of the own apparatus from CSI report interval information of a given time interval notified in advance, the subframe in which the CSI request is detected and transmission timing of CSI-RS, and transmits a feedback signal including CSI report value by using PUSCH at the timing of the CSI report subframe.

20 Claims, 29 Drawing Sheets

Related U.S. Application Data continuation of application No. 14/044,618, filed on Oct. 2, 2013, now Pat. No. 8,948,041, which is a continuation of application No. 13/375,437, filed as application No. PCT/JP2010/003030 on Apr. 27, 2010, now Pat. No. 8,588,102.

(51) Int. Cl.
    *H04W 72/12* (2009.01)
    *H04B 17/00* (2015.01)
    *H04L 5/00* (2006.01)
    *H04B 17/24* (2015.01)
    *H04B 7/06* (2006.01)
    *H04L 1/00* (2006.01)
    *H04L 1/16* (2006.01)
    *H04W 88/02* (2009.01)

(52) U.S. Cl.
    CPC ........... *H04B 17/24* (2015.01); *H04L 1/0027* (2013.01); *H04L 5/0048* (2013.01); *H04W 24/10* (2013.01); *H04W 72/1268* (2013.01); *H04L 1/0003* (2013.01); *H04L 1/0009* (2013.01); *H04L 1/1607* (2013.01); *H04W 88/02* (2013.01)

(58) Field of Classification Search
    USPC ......................................................... 370/329
    See application file for complete search history.

(56) References Cited

U.S. PATENT DOCUMENTS

| | | | |
|---|---|---|---|
| 8,320,263 B2 | 11/2012 | Kurose et al. | |
| 8,422,383 B2 | 4/2013 | Ishii | |
| 8,498,216 B2 | 7/2013 | Ishii | |
| 8,705,462 B2 | 4/2014 | Kishiyama et al. | |
| 2008/0049813 A1 | 2/2008 | Kurose et al. | |
| 2009/0041150 A1 | 2/2009 | Tsai et al. | |
| 2009/0073955 A1* | 3/2009 | Malladi ................ H04L 5/0051 370/349 |
| 2009/0204863 A1 | 8/2009 | Kim et al. | |
| 2009/0233612 A1 | 9/2009 | Iwamura et al. | |
| 2010/0040005 A1 | 2/2010 | Kim et al. | |
| 2010/0054147 A1 | 3/2010 | Ishii | |
| 2010/0074128 A1 | 3/2010 | Ishii | |
| 2010/0091672 A1 | 4/2010 | Ishii | |
| 2010/0177725 A1 | 7/2010 | van Rensburg | |
| 2010/0260119 A1 | 10/2010 | Kishiyama et al. | |
| 2011/0244847 A1 | 10/2011 | Mallik et al. | |
| 2013/0121290 A1 | 5/2013 | Kim et al. | |
| 2013/0279454 A1 | 10/2013 | Kim et al. | |
| 2014/0314016 A1 | 10/2014 | Kim et al. | |

FOREIGN PATENT DOCUMENTS

| | | |
|---|---|---|
| WO | 2004/077871 A1 | 9/2004 |
| WO | 2007/111184 A1 | 10/2007 |
| WO | 2008/105422 A1 | 9/2008 |
| WO | 2009/044710 A1 | 4/2009 |
| WO | 2010/018942 A2 | 2/2010 |

OTHER PUBLICATIONS

Extended European Search Report, dated Aug. 10, 2016, for corresponding EP Application No. 10783086.1-1870 / 2439997, 9 pages.
LG Electronics, R1, "Correction relative to maximum RB size," R1-091183, 3GPP TSG-RAN WG1 Meeting #56bis, Seoul, Korea, Mar. 23-27, 2009, 21 pages.
Nokia, Nokia Siemens Networks, "Aperiodic CQI Clarification for TDD configuration #0," R1-084307, 3GPP TSG RAN WG1 Meeting #55, Agenda Item: 6.3, Prague, Czech Republic, Nov. 10-14, 2008, 4 pages.
3GPP TSG RAN WG1 #56, R1-090619, "DL RS Designs for Higher Order MIMO," Athens, Greece, Feb. 9-13, 2009, 7 pages.
3GPP TSG RAN WG1 #56, R1-091066, "Way forward on downlink reference signals for LTE-A," Athens, Greece, Feb. 9-13, 2009, 2 pages.
3GPP TSG RAN WG1 #59, R1-094653, "Channel sounding enhancements for LTE-Advanced," Jeju, Korea, Nov. 9-13, 2009, 3 pages.
Chinese Office Action dated Dec. 1, 2015, for corresponding CN Application No. 201080024350.1, 8 pages. [With English Translation].
International Search Report mailed Jul. 13, 2010, for corresponding International Patent Application No. PCT/JP2010/003030, 2 pages.

* cited by examiner

| diff | ~-1 | 0~3 | 4~6 | 7~ |
|---|---|---|---|---|
| offset | 0 | 1 | 2 | 3 |

| BSR index | >47 | 47~32 | 31~16 | <16 |
|---|---|---|---|---|
| delay | 0 | $T_{sfc}$ | $2 \times T_{sfc}$ | $3 \times T_{sfc}$ |

| PH | <-8 | -8~7 | 8~23 | >24 |
|---|---|---|---|---|
| delay | 0 | $T_{sfc}$ | $2 \times T_{sfc}$ | $3 \times T_{sfc}$ |

WIRELESS COMMUNICATION APPARATUS AND WIRELESS COMMUNICATION METHOD

CROSS REFERENCE TO RELATED APPLICATIONS

This application is a continuation of U.S. patent application Ser. No. 14/573,901 filed Dec. 17, 2014, which is a continuation of U.S. patent application Ser. No. 14/044,618 filed Oct. 2, 2013, which is a continuation of U.S. patent application Ser. No. 13/375,437 filed on Nov. 30, 2011, which is a national-stage entry of International Application No. PCT/JP2010/003030 filed on Apr. 27, 2010, the contents of which are incorporated herein by reference.

BACKGROUND

Technical Field

The present invention relates to a wireless communication apparatus and a wireless communication method which can be applied to a wireless communication system, such as a cellular system.

Description of the Related Art

In a wireless communication system, such as a cellular system, a reference signal is introduced to obtain various indexes of a propagation channel and a transmission signal. For example, LTE (Long Term Evolution) of a next-generation communication system which is studied in the 3GPP (3rd Generation Partnership Project) as the international standards organization of mobile communication uses a reference signal (RS). In downlink communication from a base station to a user equipment, a reference signal which is transmitted from a transmission apparatus (base station) to a reception apparatus (user equipment) is mainly used for (1) estimation of a propagation channel for demodulation, (2) quality measurement for frequency scheduling and adaptive MCS (Modulation and Coding Scheme) control, and the like. In the LTE, a reference signal is transmitted in a predetermined unit of wireless resources in a multi-antenna system for applying MIMO (Multiple Input Multiple Output).

In LTE-advanced (hereinafter, referred to as LTE-A) which is a more advanced communication system than LTE, in order to achieve high-speed performance, the introduction of high-order MIMO (for example, eight transmission antennas), coordinated multiple-point transmission and reception (CoMP), or the like is studied. For this reason, in addition to a reference signal (first reference signal) which is studied in LTE, an additional reference signal (second reference signal) for LTE-A is needed, and a transmission method thereof is discussed.

For example, as described in Non-Patent Literature 1, in LTE-A, two types of reference signals are studied for the above-described purposes.

(1) Demodulation RS: for PDSCH (Physical Downlink Shared Channel) demodulation, and specific to user equipment (UE) (UE-specific) with application of the number of layers same as PDSCH and precoding.

(2) CSI-RS: for CSI (Channel State Information) measurement, (examples of CSI include CQI (Channel Quality Indicator), PMI (Precoding Matrix Indicator), RI (Rank Indicator), channel matrix, channel covariance matrix, interference component, and the like), and specific to a cell (cell-specific) with no application of precoding. Examples of specific channel quality information include CQI corresponding to a combination of a predefined modulation scheme and code rate, PMI which selects a precoding matrix based on a current channel condition from a predefined codebook, RI corresponding to the desired number of transmission links, a channel matrix in which the fading value of a MIMO channel is expressed in a matrix, a channel covariance matrix in which the components of the channel matrix are used in a channel covariance matrix, an interference component obtained by subtracting a desired signal from a reception signal, and the like.

However, the purposes are not exclusively positioned. Specifically, a discussion proceeds assuming that the CSI-RS may be used for the purpose (1).

In LTE, the minimum unit of frequency scheduling and adaptive MCS control is defined as a resource block (RB, and hereinafter, referred to as RB) in a frequency domain and as a subframe in a time domain. The signal configuration of one subframe or RB (hereinafter, referred to as 1 RB/subframe) as a resource unit is made such that a control signal and a reference signal RS are allocated from the head of the time axis, and data is subsequently allocated. The reference signal RS is allocated in a specific OFDM symbol and a specific subcarrier of the 1 RB/subframe. As an example of the CSI-RS transmission method for LTE-A, a method is known in which a CSI-RS (second reference signal) for 8 antennas is transmitted only in a specific RB/subframe, and a 4 antennas-compliant 4RS (first reference signal) for LTE is transmitted in another RB/subframe (for example, see Non-Patent Literature 2).

In the CSI-RS transmission method, a configuration is made such that an LTE user equipment compatible with only LTE can receive data at a resource which does not transmit the CSI-RS, and the 4RS for LTE is transmitted at a resource of a specific RB/subframe, allowing the LTE user equipment to perform CSI measurement. Since the RB/subframe in which the CSI-RS for 8 antennas is transmitted is arranged discretely, it is possible to perform CSI measurement with satisfactory accuracy at each resource by interpolation/averaging between the resources.

The need for discontinuously transmitting a CSI-RS as a reference signal in the above-described manner will be described. CSI-RS transmission significantly adversely affects an LTE user equipment compatible only with an existing system. Specifically, if a rule is provided to multiplex a resource transmitting a CSI-RS to only an allocated resource of an advanced system-compliant user equipment (hereinafter, referred to as an LTE-A user equipment), there is a restriction on scheduling with respect to the LTE user equipment. If such a rule is not provided, a signal which cannot be recognized from the LTE user equipment on the LTE user equipment-allocated resource is multiplexed, causing degradation of demodulation performance in the user equipment. Since any phenomenon described above is not preferable, a solution is made such that CSI-RS transmission is limited at a specific time resource focusing on resources in the time domain. That is, it is necessary to discontinuously transmit the CSI-RS, instead of transmitting the CSI-RS in continuous subframes.

An example of a procedure of a channel quality information (CSI) request, CSI measurement and report will be described with reference to FIG. 30. FIG. 30 is an operation explanatory diagram showing a procedure of a channel quality information request and a report in response to the channel quality information request in LTE. Here, description will be provided assuming communication between a base station (eNB: evolved Node-B) and a user equipment (UE) in a cellular mobile communication system.

The base station (eNB) transmits a cell-specific reference signal (cell-specific RS: CRS) in each subframe. When an instruction for a CSI request is indicated to a user equipment (UE1 or UE2), the base station sends a notification to the user equipments using a downlink control channel PDCCH (Physical Downlink Control Channel). Here, as an operation example of the user equipment, the behavior of a first user equipment UE1 will be described. If an own apparatus-addressed CSI request is detected by the PDCCH, UE1 performs CSI measurement using the CRS of the subframe, and reports CSI to the base station using an uplink data channel PUSCH (Physical Uplink Shared Channel) after a predefined number of subframes (in this case, 4 subframes). The base station performs uplink resource allocation assuming a PUSCH subframe for a CSI report from the user equipment, and indicates a request by the PDCCH. In the base station, an uplink signal from UE1 is received in accordance with the PDCCH which indicates the request and the content of the CSI report is detected. The base station realizes frequency scheduling of downlink data and adaptive MCS control using the obtained CSI.

The reasons for defining the number of subframes from the CSI request to the CSI report include a reason from the viewpoint of the CSI report due to the amount of processing in the user equipment, and a reason from the viewpoint of the utilization of CSI when the scheduler of the base station which receives the CSI report utilizes the relevant information. For the former reason due to the amount of processing in the user equipment, it is necessary that CSI measurement is performed after the CSI request is received, the amount of processing necessary for encoding/modulating the relevant information to generate a signal is taken into consideration, and a processing time equal to or greater than a given time is provided for realization with no large load. Accordingly, it is necessary to define the number of subframes equal to or greater than a given time as a requirement from the viewpoint of the CSI report.

For the latter reason from the viewpoint of the utilization of CSI, processing is performed for allocating the resource of each user equipment on the basis of the reported CSI information. Thus, taking into consideration the efficiency of resource allocation, it is preferable that there is a slight change between the actual allocation time and the CSI measurement time. However, in a wireless propagation environment, as the time elapses, the change in CSI increases due to time-dependent fading. For this reason, as the requirement from the viewpoint of the utilization of CSI, it is necessary to set a subframe within a given time in which the efficiency of resource allocation is not significantly degraded. The number of subframes from the CSI request to the CSI report is determined such that the requirements from the two viewpoints are compatible.

The same discussion is established as to a reference signal at the time of uplink communication from a user equipment to a base station. In LTE-A, the introduction of a technique, such as MIMO, is studied in which multiple transmission systems (antennas and transmission amplifiers) are provided in a user equipment, and it is necessary to transmit a reference signal for frequency scheduling and adaptive MCS control using multiple transmission systems. Thus, the expansion of a sounding RS (SRS) which is one of the reference signals for use in LTE in compliant with multiple transmission systems is studied. For example, as described in Non-Patent Literature 3, a method is studied in which an SRS is transmitted from a user equipment at an indicated timing in accordance with a request from a base station. With regard to SRS transmission in LTE, similarly to the need for discontinuous transmission in CSI-RS, the SRS can be transmitted and received once at a set interval $T_{sfc}$ of the base station LTE such that an adverse effect on data transmission of the user equipment is minimized.

CITATION LIST

Non-Patent Literature

Non-Patent Literature 1: 3GPP TSG RAN WG1 #56, R1-091066, CATT, CMCC, Ericsson, Huawei, LGE, Motorola, Nokia, Nokia Siemens Networks, Nortel, Panasonic, Philips, Qualcomm Europe, Samsung, Texas Instruments, "Way forward on downlink reference signals for LTE-A", Feb. 9-13, 2009

Non-Patent Literature 2: 3GPP TSG RAN WG1 #56, R1-090619, Samsung, "DL RS Designs for Higher Order MIMO", Feb. 9-13, 2009

Non-Patent Literature 3: 3GPP TSG RAN WG1 #59, R1-094653, Nokia Siemens Networks, Nokia, "Channel sounding enhancements for LTE-Advanced", Nov. 9-13, 2009

BRIEF SUMMARY

Technical Problem

However, in the above-described transmission method which discontinuously transmits a CSI-RS, the following problem occurs. FIG. 31 is an operation explanatory diagram illustrating a problem in a CSI-RS transmission method in which a CSI-RS is discontinuously transmitted. For the higher advancement of a communication system, it is assumed that a reference signal (CSI-RS) for channel quality measurement, such as CoMP or high-order MIMO, is discontinuously transmitted. In this case, since it is necessary to coordinate the transmission timing of a reference signal as a measurement target with the timing at which an instruction of a CSI request is indicated, CSI requests concentrate in a specific subframe from the base station eNB to the user equipments UE1 and UE2. Accordingly, a CSI request is indicated to a plurality of user equipments simultaneously, and it is necessary to generate a corresponding PDCCH in the relevant subframe. For this reason, the PDCCH which is a finite resource is consumed, making it difficult to allocate downlink data to the relevant subframe. Thus, the throughput of downlink data in the relevant subframe is degraded. As described above, since CSI reports are simultaneously sent from the user equipments UE1 and UE2 to the base station eNB after a predefined number of subframes from the CSI request, a corresponding uplink resource in the relevant subframe is consumed. For this reason, it becomes difficult to allocate uplink data to the relevant subframe, causing degradation in throughput of uplink data.

In the above-described transmission method which sets an SRS subframe only at a specific interval, the following problem occurs. FIG. 32 is an operation explanatory diagram illustrating a problem in an SRS transmission method which sets an SRS subframe only at a specific interval. It is necessary to coordinate the transmission timing of a reference signal as a measurement target with the timing at which an SRS instruction is indicated, SRS instructions concentrate in a specific subframe from the base station eNB to the user equipments UE1 and UE2. Accordingly, an SRS instruction is indicated to a plurality of user equipments simultaneously, and it is necessary to generate a corresponding PDCCH in the relevant subframe. For this reason, the PDCCH which is a finite resource is consumed, making it difficult to allocate downlink data to the relevant subframe. Thus, the throughput of downlink data in the relevant subframe is degraded. As described above, since SRS are simultaneously transmitted from the user equipments UE1 and UE2 to the base station eNB after a predefined number of subframes from the SRS instruction, a corresponding uplink resource in the relevant subframe is consumed. For this reason, it becomes difficult to allocate uplink data to the relevant subframe, causing degradation in throughput of uplink data.

The present invention has been achieved in consideration of the above-described situation, and an object of the invention is to provide a wireless communication apparatus and a wireless communication method capable of suppressing concentration of channel quality information requests and reports in a case of discontinuously transmitting reference signals at specific resources in a time domain, and thereby preventing degradation in throughput.

Solution to Problem

The invention provides, as a first aspect, a wireless communication apparatus, including: a reference signal generator that is configured to generate a reference signal for allowing a reception apparatus serving as a communication party to calculate a channel quality of a transmission channel; a channel quality information request setting section that is configured to set a transmission timing of a channel quality information request for causing channel quality information with respect to the reference signal to be fed back from the reception apparatus so that timings are set to be temporally distributed over the plurality of reception apparatuses simultaneously with or before a transmission timing of the reference signal to be discontinuously transmitted on the time axis; a channel quality information report setting section that is configured to set a transmission timing of a channel quality information report to be transmitted from the reception apparatus in response to the channel quality information request so that a report interval is set to a given time interval as a time interval from transmission of the channel quality information request to transmission of the channel quality information report from the reception apparatus; and a communication section that is configured to transmit the reference signal and the channel quality information request, and receive the channel quality information report.

The invention includes, as a second aspect, the wireless communication apparatus, wherein the channel quality information report setting section is configured to set the report interval to be a time interval obtained by adding a predetermined offset to a time interval necessary from reception of the reference signal to transmission of the channel quality information report in the reception apparatus.

The invention includes, as a third aspect, the wireless communication apparatus, wherein the channel quality information report setting section is configured to set the predetermined offset to be a value corresponding to the number of reception apparatuses under the wireless communication apparatus.

The invention includes, as a fourth aspect, the wireless communication apparatus, the channel quality information report setting section is configured to set the report interval to be a time interval matched with a retransmission interval at the time of communication with the reception apparatus.

The invention includes, as a fifth aspect, the wireless communication apparatus, including a report interval information notification section that is configured to notify the reception apparatus of report interval information which indicates the report interval.

The invention includes, as a sixth aspect, the wireless communication apparatus, wherein the channel quality information report setting section is configured to instruct a timing, at which the channel quality information report is transmitted from the reception apparatus serving as the communication party, to the communication section, and the communication section is configured to receive the channel quality information report at the indicated timing.

The invention includes, as a seventh aspect, the wireless communication apparatus, including a resource allocation section that is configured to allocate resources regarding communication from the wireless communication apparatus to the reception apparatus and communication from the reception apparatus to the wireless communication apparatus on the basis of the transmission timing of the channel quality information request and the transmission timing of the channel quality information report.

The invention provides, as an eighth aspect, a wireless communication apparatus, including: a channel quality calculator that is configured to calculate a channel quality of a transmission channel on the basis of a reference signal discontinuously transmitted on the time axis received from a transmission apparatus serving as a communication party; a feedback information generator that is configured, when one of channel quality information requests transmitted at timings temporally distributed over a plurality of reception apparatuses including the wireless communication apparatus is received from the transmission apparatus simultaneously with or before a transmission timing of the reference signal, to generate feedback information including a channel quality information report which indicates the calculated channel quality on the basis of a preset report interval which is a given time interval from transmission of the channel quality information request to transmission of the channel quality information report in response to the channel quality information request; and a communication section that is configured to receive the reference signal and the channel quality information request, and transmit the channel quality information report.

The invention includes, as a ninth aspect, the wireless communication apparatus, wherein the feedback information generator is configured to generate the feedback information including the channel quality information report on the basis of a time interval, set as the report interval, obtained by adding a predetermined offset to a time interval necessary from reception of the reference signal to transmission of the channel quality information report.

The invention includes, as a tenth aspect, the wireless communication apparatus, wherein the feedback information generator is configured to generate the feedback information including the channel quality information report on the basis of a time interval, set as the report interval, matched with a retransmission interval at the time of communication with the transmission apparatus.

The invention provides, as an eleventh aspect, a wireless communication base station apparatus, including any one of the wireless communication apparatus.

The invention provides, as a twelfth aspect, a wireless communication mobile station apparatus including any one of the wireless communication apparatus.

The invention provides, as a thirteenth aspect, a wireless communication method in a wireless communication apparatus, the wireless communication method including: generating a reference signal for allowing a reception apparatus serving as a communication party to calculate a channel quality of a transmission channel; when setting transmission timing of a channel quality information request for causing channel quality information with respect to the reference signal to be fed back from the reception apparatus, setting timings temporally distributed over a plurality of reception apparatuses simultaneously with or before transmission timing of the reference signal discontinuously transmitted on the time axis; when setting transmission timing of a channel quality information report in response to the channel quality information request to be transmitted from the reception apparatus, setting a report interval to be a given time interval as a time interval from transmission of the channel quality information request to transmission of the channel quality information report from the reception apparatus; and transmitting the reference signal and the channel quality information request, and receiving the channel quality information report.

The invention provides, as a fourteenth aspect, a wireless communication method in a wireless communication apparatus, the wireless communication method including: calculating a channel quality of a transmission channel on the basis of a reference signal discontinuously transmitted on the time axis received from a transmission apparatus serving as a communication party; when one of channel quality information requests which are transmitted at timings temporally distributed over a plurality of reception apparatuses including the wireless communication apparatus is received from the transmission apparatus simultaneously with or before the transmission timing of the reference signal, generating feedback information including a channel quality information report which indicates the calculated channel quality on the basis of a preset report interval which is a preset given time interval from transmission of the channel quality information request to transmission of the channel quality information report in response to the channel quality information request; and transmitting the channel quality information report.

With the above-described configuration, the timing at which a channel quality information request is transmitted and the timing at which a channel quality information report is transmitted are respectively distributed. Thus, it is possible to distribute communication resources to be used for channel quality information requests in the time domain, and also to distribute communication resources to be allocated as channel quality information reports. Therefore, it is possible to suppress concentration of channel quality information requests and channel quality information reports at specific resources in the time domain, making it possible to prevent degradation in throughput.

Advantageous Effects of Invention

According to the invention, it is possible to provide a wireless communication apparatus and a wireless communication method capable of suppressing concentration of channel quality information requests and reports in a case of discontinuously transmitting reference signals at specific resources in a time domain, and thereby preventing degradation in throughput.

DETAILED DESCRIPTION

Embodiments show an example where a wireless communication apparatus and a wireless communication method according to the invention are applied to a cellular system for mobile communication, such as a mobile phone. Here, a case will be described where communication by MIMO is performed in a wireless communication system in which a base station (BS: also called eNB) serves as a transmission apparatus and a user equipment (UE) of a mobile station serves as a reception apparatus. It is assumed that a base station performs communication with a user equipment compatible with LTE serving as a first communication system and a user equipment compatible with LTE-A serving as a second communication system. The relationship between the first communication system (LTE) and the second communication system (LTE-A) is established on the assumption that the second communication system is a communication system which accepts a larger number of transmission antennas on the reception side than in the first communication system. In this case, a reference signal for frequency scheduling or adaptive MCS control is transmitted from the base station to the user equipment. As the reference signal, in addition to a first reference signal 4RS for LTE (for 4 antennas), a second reference signal CSI-RS for LTE-A (for 8 antennas) is used.

First Embodiment

In a first embodiment, a CSI request as a channel quality information request is transmitted from a transmission apparatus to each reception apparatus to be temporally distributed over a plurality of reception apparatuses at the timing simultaneously with or earlier than the transmission timing of a reference signal CSI-RS for measuring CSI. The CSI request is a request which causes a CSI report value as a channel quality information report to be fed back from a reception apparatus serving as a communication party. Each reception apparatus calculates CSI from the reference signal CSI-RS, and transmits the CSI report from the reception apparatus to the transmission apparatus at the timing when a CSI report interval which is a given time interval set in advance elapses from the reception timing of the CSI request. The set value of the CSI report interval is a given subframe interval, and set in accordance with, for example, the number of reception apparatuses which perform communication, or the like, and is notified from the transmission apparatus to the reception apparatus. Thus, the timing at which the CSI request is transmitted and the timing at which the CSI report is transmitted respectively are distributed.

Next, the configuration of specific examples of a transmission apparatus and a reception apparatus in a wireless communication system of this embodiment will be described.

Figure 1:
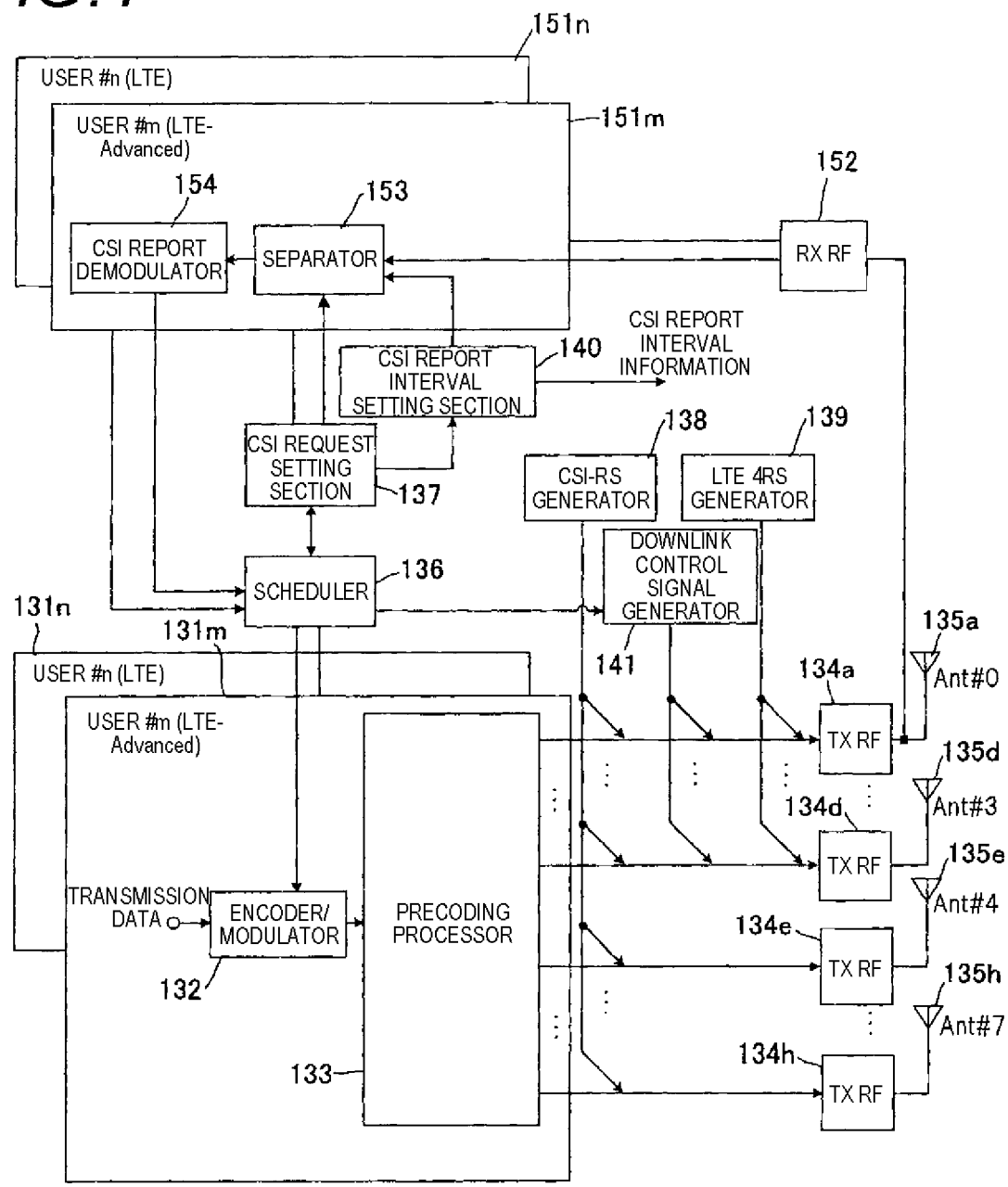
FIG. 1 is a block diagram showing the configuration of a main part of a transmission apparatus according to a first embodiment of the invention.
Figure 2:
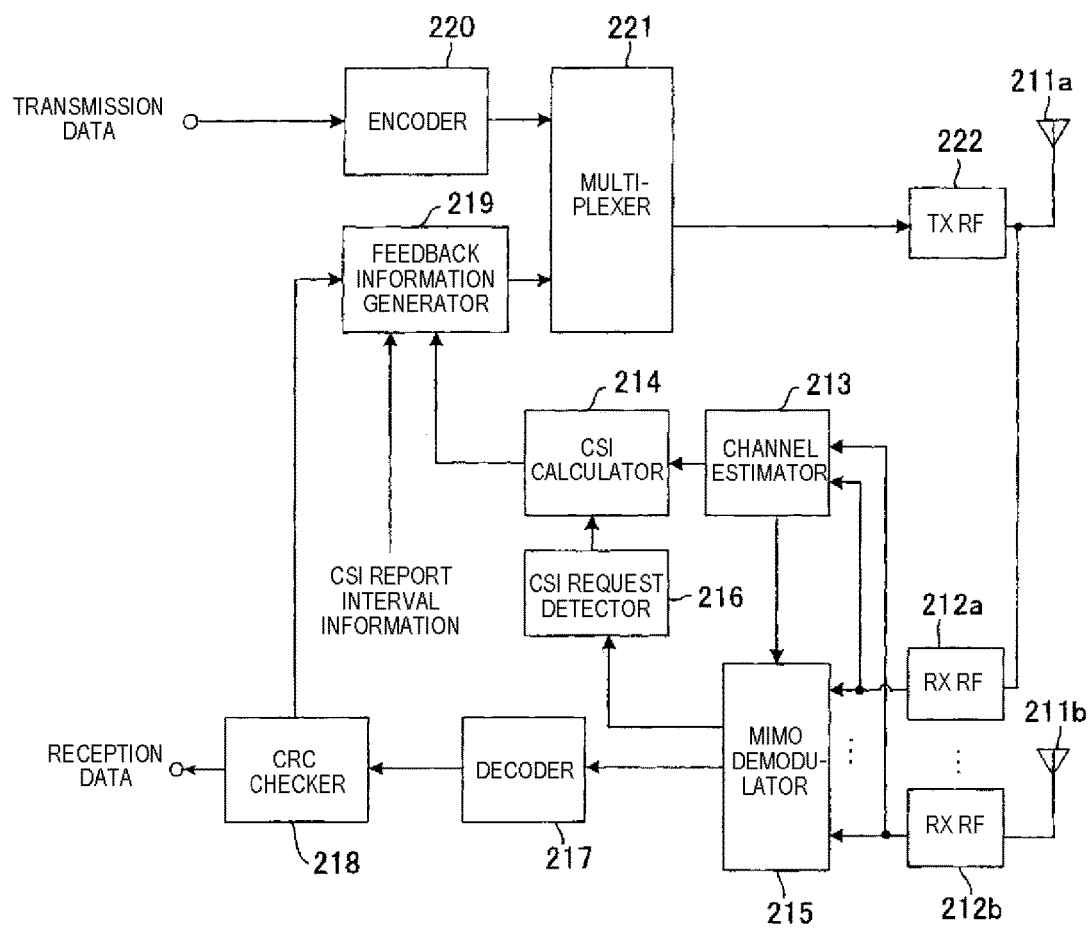
FIG. 2 is a block diagram showing the configuration of a main part of a reception apparatus according to the first embodiment of the invention.

FIG. 1 is a block diagram showing the configuration of a main part of a transmission apparatus according to a first embodiment of the invention. FIG. 2 is a block diagram showing the configuration of a main part of a reception apparatus according to the first embodiment of the invention.

In this embodiment, it is assumed that wireless communication is performed between the transmission apparatus shown in FIG. 1 and the reception apparatus shown in FIG. 2 using radio waves. Here, it is assumed that the transmission apparatus shown in FIG. 1 is applied to a wireless communication base station apparatus (base station, BS, eNB) of a cellular system, and the reception apparatus shown in FIG. 2 is applied to a user equipment (UE) serving as a wireless communication mobile station apparatus, such as a mobile phone. Here, it is assumed that a MIMO system is configured in which wireless transmission/reception is performed using a plurality of antennas at the time of both transmission and reception, the transmission apparatus can perform transmission to each of a plurality of reception apparatuses, and precoding transmission is performed such that a plurality of antennas are weighted on the transmission side. As the form of a communication signal, it is assumed that communication is performed by a multi-carrier communication method using an OFDM (Orthogonal Frequency Division Multiplexing) signal. As a specific example, a case will be described where the base station serving as a transmission apparatus performs communication with an LTE-compliant LTE user equipment and an LTE-A-compliant LTE-A user equipment serving as a reception apparatus.

The transmission apparatus shown in FIG. 1 includes a plurality of user equipment transmission signal processors 131m and 131n, an encoder/modulator 132, a precoding processor 133, a plurality of transmission RF sections 134a to 134d and 134e to 134h, and a plurality of antennas 135a to 135d and 135e to 135h. The transmission apparatus also includes a scheduler 136, a CSI request setting section 137, a CSI-RS generator 138, an LTE 4RS generator 139, a CSI report interval setting section 140, and a downlink control signal generator 141. The transmission apparatus also includes a plurality of user equipment reception signal processors 151m and 151n, a reception RF section 152, a separator 153, and a CSI report demodulator 154.

A radio wave which is transmitted from a counterpart apparatus (for example, the reception apparatus shown in FIG. 2) is received by the antenna 135a. A high-frequency signal of the radio wave received by the antenna 135a is converted to a signal in a comparatively low frequency band, such as a baseband signal, by the reception RF section 152, and then input to the user equipment reception signal processors 151m and 151n. The user equipment reception signal processors 151m and 151n perform signal processing on reception signals corresponding to the user equipments for LTE-A, LTE, and the like, and respectively have a separator 153 and a CSI report demodulator 154. The separator 153 separates a feedback signal from a reception signal, outputs a CQI report in the feedback signal to the CQI report demodulator 154, and outputs other reception signals to a demodulator/decoder (not shown). The CQI report in the feedback signal is demodulated in the CQI report demodulator 154 and input to the scheduler 136. The scheduler 136 performs at least one of frequency scheduling and adaptive MCS control as scheduling relating to a transmission signal on the basis of channel quality information CQI reported from the reception apparatus.

The user equipment transmission signal processors 131m and 131n perform signal processing on transmission signals corresponding to the user equipment for LTE-A, LTE, and the like, and respectively have an encoder/modulator 132 and a precoding processor 133. The encoder/modulator 132 performs encoding of transmission data, multiplexing of a control signal or the like, rate-matching, interleaving, modulation, or the like, and outputs the result to the precoding processor 133. The precoding processor 133 performs weighting for forming beams of transmission waves on transmission signals output to a plurality of antennas, and outputs the transmission signals to the transmission RF sections 134a to 134d and 134e to 134h of the antennas.

In the transmission RF sections 134a to 134d and 134e to 134h, processing, such as serial/parallel conversion or inverse Fourier transform, is performed on the transmission signals. Then, the transmission signals are converted to high-frequency signals in a predetermined radio frequency band, power-amplified, and then transmitted from the antennas 135a to 135d and 135e to 135h as radio waves. In the example of the figure, a transmitter for LTE-A generates transmission signals which are transmitted using 8 antennas. The transmission signals from the transmission apparatus are transmitted to the reception apparatuses as notification channels, control signals, data signals including various kinds of data, and the like. The notification channels and the control signals are transmitted as nondirective signals which do not form beams, and the data signals are transmitted as directive signals which form predetermined beams based on beam numbers by precoding in predetermined transmission channels.

The CSI request setting section 137 sets the CSI request transmission timing to each reception apparatus, and notifies setting information of the CSI request transmission timing to the CSI report interval setting section 140 and each user equipment reception signal processor. The CSI request setting section 137 sends a notification to the scheduler 136 to generate a control signal of a CSI request for UE in a subframe of the set CSI request transmission timing. The CSI report interval setting section 140 sets a time interval (the number of subframes) from when a CSI request is transmitted until a CSI report is received (from when a CSI request of the own apparatus is transmitted until a CSI report of a communication party apparatus is transmitted) as a CSI report interval corresponding to a report interval. In this case, an integer value which is a value common to a plurality of reception apparatuses belonging to the own apparatus is set. The CSI report interval setting section 140 notifies the value of the set CSI report interval to each reception apparatus regularly through a notification channel or the like. The CSI report interval setting section 140 receives the setting information of the CSI request transmission timing from the CSI request setting section 137 to each reception apparatus, and instructs a subframe, in which a CSI report determined on the basis of the set CSI report interval is transmitted, to the separator 153 of the relevant UE.

The separator 153 obtains the information of the CSI request transmission timing from the CSI request setting section 137, receives the value of the CSI report interval from the CSI report interval setting section 140, and recognizes the timing of a subframe in which a CSI report is transmitted from the relevant UE. The separator 153 retrieves a CSI report from a reception signal in the relevant subframe, and outputs the CSI report to the CSI report demodulator 154.

The CSI-RS generator 138 generates a reference signal CSI-RS for LTE-A (for 8 antennas), and allocates CSI-RS at a resource corresponding to the relevant transmission subframe. The LTE 4RS generator 139 generates a reference signal 4RS for LTE (for 4 antennas), and allocates 4RS at each resource. In the configuration example of FIG. 1, it is assumed that CSI-RS is allocated at Ant#4 to Ant#7 (antennas 135e to 135h) with the intention of the application to high-order MIMO, and only the reference signal 4RS for LTE is allocated at Ant#0 to Ant#3 (antennas 135a to 135d) and transmitted.

The scheduler 136 performs resource allocation of each user equipment using the channel quality information CQI received from the CSI report demodulator 154. The downlink control signal generator 141 generates a downlink control signal including allocation information of a downlink signal on the basis of the allocation of each user equipment by the scheduler 136. Although the figure with the intention of the application to high-order MIMO has been described, CSI-RS transmission is not limited thereto. Although an example has been described where 4 antennas are provided for LTE and additional 4 antennas are provided for high-order MIMO, the invention is not limited thereto. For example, 2 antennas may be provided for LTE and additional 2 antennas may be provided for high-order MIMO, a combination of both LTE and high-order MIMO may be made, or 8 antennas in total of 2 antennas for LTE and 6 antennas for high-order MIMO may be provided, or the like.

In the above configuration, the CSI-RS generator 138 realizes the functions of a reference signal generator. The CSI request setting section 137 realizes the functions of a channel quality information request setting section. The CSI report interval setting section 140 realizes the functions of a channel quality information report setting section. The user equipment signal processors 131m and 131n, the transmission RF sections 134a to 134d and 134e to 134h, the reception RF section 152, the user equipment reception signal processors 151m and 151n realize the functions of a communication section. The scheduler 136 realizes the functions of a resource allocator.

The reception apparatus shown in FIG. 2 includes a plurality of antennas 211a and 211b, a plurality of reception RF sections 212a and 212b, a channel estimator 213, a CSI calculator 214, a MIMO demodulator 215, a CSI request detector 216, a decoder 217, a CRC checker 218, a feedback information generator 219, an encoder 220, a multiplexer 221, and a transmission RF section 222.

Radio waves which are transmitted from a counterpart apparatus (for example, the transmission apparatus shown in FIG. 1) are received by a plurality of separate antennas 211a and 211b. A high-frequency signal of the radio wave received by the antenna 211a is converted to a signal in a comparatively low frequency band, such as a baseband signal, by the reception RF section 212a, and undergoes processing, such as Fourier transform or parallel/serial conversion, to be converted to a reception signal of serial data. Similarly, a high-frequency signal of the radio wave received by the antenna 211b is converted to a signal in a comparatively low frequency band, such as a baseband signal, by the reception RF section 212b, and undergoes processing, such as Fourier transform or parallel/serial conversion, to be converted to a reception signal of serial data.

The outputs of the reception RF sections 212a and 212b are input to the channel estimator 213 and the MIMO demodulator 215.

The channel estimator 213 performs channel estimation on the basis of a reference signal in a signal transmitted from each transmission antenna of the counterpart apparatus (transmission apparatus), and calculates a channel estimation value. In this case, the reception apparatus specifies the position of a reference signal for channel quality measurement on the basis of control information separately notified from the transmission apparatus. Channel estimation is performed assuming that a reference signal is allocated in a predefined OFDM symbol of the relevant resource and a subcarrier. The channel estimation value calculated by the channel estimator 213 is input to the CSI calculator 214 and the MIMO demodulator 215.

The MIMO demodulator 215 performs demodulation on a reception signal corresponding to the own apparatus (own reception apparatus) using the channel estimation value received from the channel estimator 213, and outputs the demodulated signal to the decoder 217. At this time, deinterleaving, rate-dematching, likelihood combining, and the like are performed. The decoder 217 performs decoding on a signal input from the MIMO demodulator 215 to restore reception data. At this time, error-correction decoding is performed on a signal after MIMO separation received from the MIMO demodulator 215, and the result is output to the CRC checker 218. The CRC checker 218 performs error detection on a signal after decoding output from the decoder 217 through CRC (Cyclic Redundancy Check) check, and outputs information regarding the presence/absence of a data error indicating whether or not reception data after decoding includes an error to the feedback information generator 219. Then, reception data is output from the CRC checker 218.

The CSI request detector 216 receives a demodulated signal output from the MIMO demodulator 215 as input, detects a CSI request signal, and notifies the detection result to the CSI calculator 214. When a CSI request signal is detected by the CSI request detector 216, the CSI calculator 214 calculates channel quality information (CQI, PMI, RI, and the like) on the basis of the channel estimation value in the channel estimator 213, and outputs the result to the feedback information generator 219 as a CSI report value.

The feedback information generator 219 generates feedback information including the CSI report value calculated by the CSI calculator 214, and outputs the feedback information to the multiplexer 221. At this time, the reception apparatus stores CSI report interval information separately notified from the transmission apparatus through a notification channel or the like in the feedback information generator 219. The feedback information generator 219 generates a signal with the CSI report value received from the CSI calculator 214 as feedback information in a subframe delayed by the CSI report interval set value.

If it is necessary to transmit the decoding result (Ack/Nack) of downlink data in the relevant subframe, the feedback information generator 219 determines whether or not decoded reception data includes an error on the basis of the error detection result in the CRC checker 218, and generates Ack/Nack information. If the decoding result does not include an error, Ack (Acknowledgement) is generated, and if the decoding result includes an error, Nack (Negative Acknowledgement) is generated. The CSI report value and the Ack/Nack information are synthesized and output to the multiplexer 221.

The encoder 220 performs encoding on transmission data and outputs the result to the multiplexer 221. The multiplexer 221 performs multiplexing on a transmission signal including input feedback information, encoded transmission data, and the like. Rate-matching for adaptively setting the number of modulation multiple values or the code rate, interleaving, modulation, and the like are performed, and the result is output to the transmission RF section 222. In the transmission RF section 222, processing, such as serial/parallel conversion or inverse Fourier transform, is performed. Then, the transmission signal is converted to a high-frequency signal in a predetermined radio frequency band, power-amplified, and then transmitted from the antenna 211a as a radio wave. At this time, the feedback information, such as the CSI report value or the Ack/Nack information, which is transmitted from the reception apparatus is transmitted to the transmission apparatus as a feedback signal and reported.

In the above configuration, the channel estimator 213 and the CSI calculator 214 realize the functions of a channel quality calculator. The feedback information generator 219 realizes the functions of a feedback information generator. The reception RF sections 212a and 212b, the MIMO demodulator 215, the multiplexer 221, and the transmission RF section 222 realize the functions of a communication section.

Figure 3:
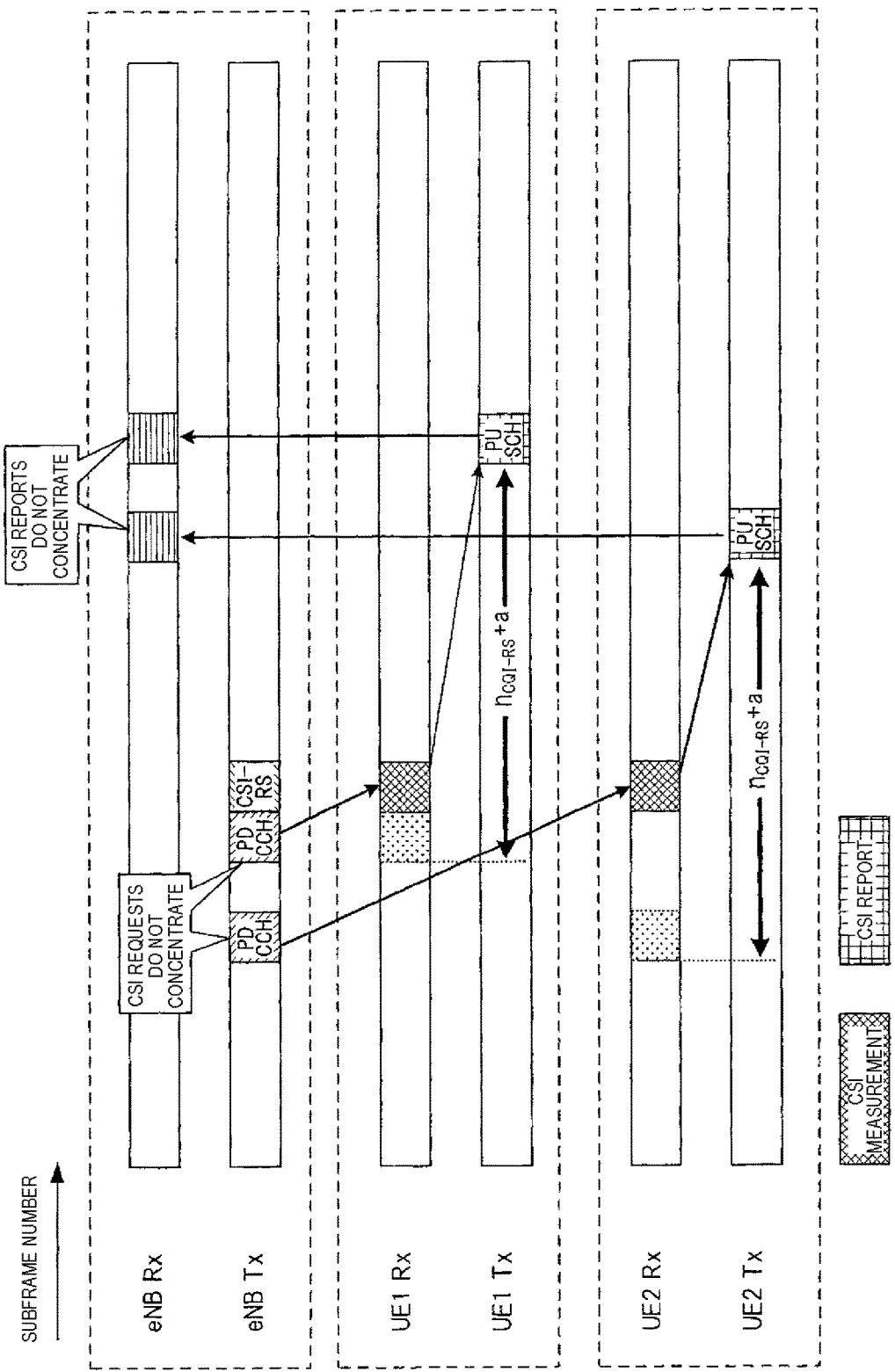
FIG. 3 is a diagram showing an operation relating to a CSI request and a CSI report in the first embodiment.

Next, the operations of the transmission apparatus and the reception apparatus in the first embodiment will be described in detail. FIG. 3 is a diagram showing an operation relating to a CSI request and a CSI report in the first embodiment. Here, a case will be described where a CSI request is transmitted from a base station (eNB) serving as a transmission apparatus to two user equipments (UE1 and UE2) serving as a reception apparatus, and a CSI report is returned from each user equipment to the base station.

The transmission apparatus eNB sets the CSI report interval set value $n_{CSI\text{-}RS}+a$ as a value common to a plurality of reception apparatuses belonging to the own apparatus in advance in the CSI report interval setting section 140. $n_{CSI\text{-}RS}$ is the minimum required number of subframes from when CSI-RS is received until a CSI report is transmitted for the reason from the viewpoint of a CSI report due to the amount of processing in the user equipment, and 'a' is an offset value which is added as a fixed value. The offset value 'a' is a value which can be changed depending on the situation. For example, an integer value equal to or greater than 1 is determined by the number of user equipments serving as a reception apparatus under the base station at present. CSI report interval information indicating the CSI report interval set value $n_{CSI\text{-}RS}+a$ is notified to each reception apparatus regularly through a notification channel or the like. In this case, the minimum required number $n_{CSI\text{-}RS}$ of subframes of the CSI report interval is known in the reception apparatus through a prenotification from the transmission apparatus. Thus, it should suffice that, for example, only the offset value 'a' is notified from the transmission apparatus to the reception apparatus through signaling. In addition to the offset value 'a', the CSI report interval set value $n_{CSI\text{-}RS}+a$, the minimum required number $n_{CSI\text{-}RS}$ of subframes, and the like may be notified.

The maximum value of the CSI report interval set value $n_{CSI\text{-}RS}+a$ is set to be smaller than the transmission interval (for example, a 10-subframes interval (10 msec interval)) of the reference signal CSI-RS. Similarly to the offset value 'a', the CSI report interval set value $n_{CSI\text{-}RS}+a$ or the maximum value of the minimum required number $n_{CSI\text{-}RS}$ of subframes may be variably determined depending on the situation of the user equipment serving as a reception apparatus, or the like.

The transmission apparatus sets the transmission timing of the CSI request at the timing not overlapping between the reception apparatuses in the CSI request setting section 137, and performs scheduling of resources for transmitting the reference signal CSI-RS and the CSI request in the scheduler 136. The user equipment transmission signal processor 131$m$ outputs an instruction of the CSI request to the reception apparatuses UE1 and UE2 to be distributed over the reception apparatuses in a subframe at the timing simultaneously with or earlier than the reference signal CSI-RS. The CSI request is notified to the reception apparatus using the downlink control channel PDCCH of the relevant timing. In this case, the transmission timing of the CSI request which is transmitted to each reception apparatus earlier than CSI-RS is set such that the time interval from when the CSI request is transmitted until CSI-RS is transmitted is equal to or smaller than the offset value 'a' of the CSI report interval set value $n_{CSI-RS}+a$. Thus, in each reception apparatus, it is possible to secure the minimum required number $n_{CSI-RS}$ of subframes from when CSI-RS is received until the CSI report is transmitted.

A reception apparatus UE which meets the CSI request specifies a CSI report subframe of the own apparatus from the CSI report interval information notified previously, the subframe in which PDCCH including the CSI request is detected, and the transmission timing of CSI-RS. A subframe when the CSI report interval set value $n_{CSI-RS}+a$ elapses from the subframe in which the own apparatus-addressed CSI request is detected becomes the CSI report subframe. As a CSI report operation, the reception apparatus detects the CSI request from the transmission apparatus in the CSI request detector 216, and calculates CSI from the channel estimation value of CSI-RS received after CSI request detection in the CSI calculator 214. In the feedback information generator 219, a feedback signal including the CSI report value is generated and output at the timing of the specified CSI report subframe. The feedback signal including the CSI report value is reported to the transmission apparatus using the uplink data channel PUSCH of the relevant timing.

With the above-described operation, from the viewpoint of the transmission apparatus eNB, it is possible to distribute the downlink control channel PDCCH for a CSI request in the time domain. Simultaneously, it is possible to distribute the resource of the uplink data channel PUSCH which is allocated as a CSI report.

As described above, in the first embodiment, the timing at which the CSI request is transmitted from the transmission apparatus to each reception apparatus is distributed at the timing simultaneously with or earlier than CSI-RS, and the CSI report is transmitted from each reception apparatus to the transmission apparatus at the timing after a given subframe interval set in advance from the reception timing of the CSI request. Therefore, it is possible to distribute the timing at which the CSI request is transmitted and the timing at which the CSI report is transmitted, thereby suppressing concentration of CSI requests and CSI reports at specific resources in the time domain and preventing degradation in throughput.

Second Embodiment

In a second embodiment, the given CSI report interval set value in the first embodiment is set to be matched with a retransmission interval at the time of communication between a transmission apparatus and a reception apparatus in a wireless communication system. The transmission apparatus transmits a CSI request to each reception apparatus to be temporally distributed simultaneously with or earlier than the transmission timing of the reference signal CSI-RS for CSI measurement. Each reception apparatus calculates CSI from the reference signal CSI-RS, and transmits a CSI report to the transmission apparatus at the timing when the CSI report interval set value elapses from the reception timing of the CSI request, that is, when the retransmission interval elapses after the CSI request is received. Thus, the timing at which the CSI request is transmitted and the timing at which the CSI report is transmitted respectively are distributed.

Figure 4:
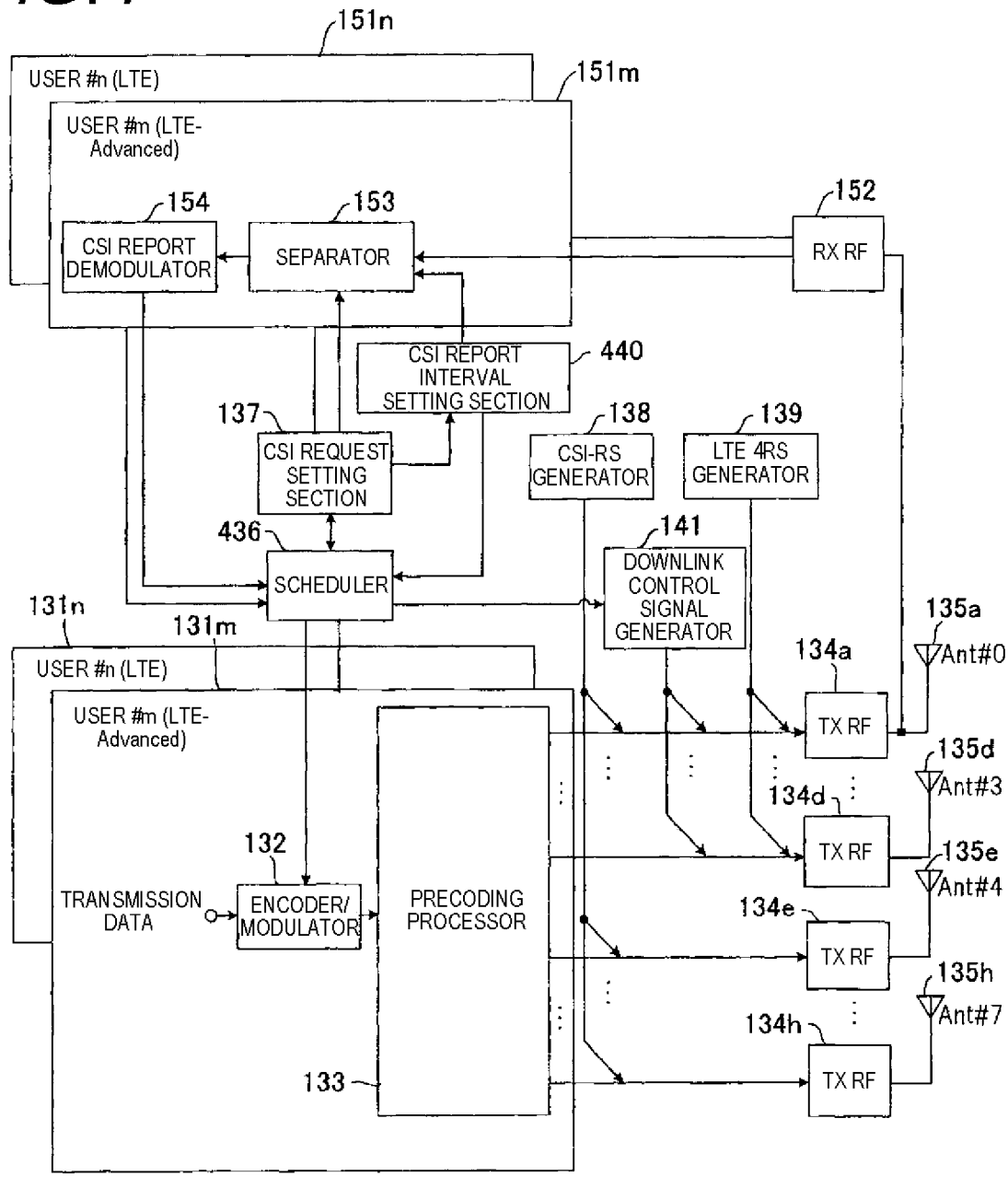
FIG. 4 is a block diagram showing the configuration of a main part of a transmission apparatus according to a second embodiment of the invention.

FIG. 4 is a block diagram showing the configuration of a main part of a transmission apparatus according to a second embodiment of the invention. In the figure, the same constituent elements as those in the first embodiment are represented by the same reference numerals. Description will be mainly provided focusing on portions different from the first embodiment, and description of the same portions will be omitted.

In the transmission apparatus of the second embodiment, the operations of a CSI report interval setting section 440 and a scheduler 436 are different from those in the first embodiment. The CSI report interval setting section 440 sets an integer value, which is a value common to a plurality of reception apparatuses belonging to the own apparatus, as a CSI report interval. The CSI report interval is set to be matched with the retransmission interval in the wireless communication system. The CSI report interval setting section 440 notifies the set value of the CSI report interval to each reception apparatus regularly through a notification channel or the like. The CSI report interval setting section 440 notifies the scheduler 436 that the interval between a CSI request and a CSI report obtained by applying the CSI report interval set value is matched with the retransmission interval of an uplink data signal. The scheduler 436 regards an uplink resource, which is consumed by the CSI request and the CSI report, as a specific retransmission process, and performs uplink data allocation positively using an irrelevant the retransmission process.

Figure 5:
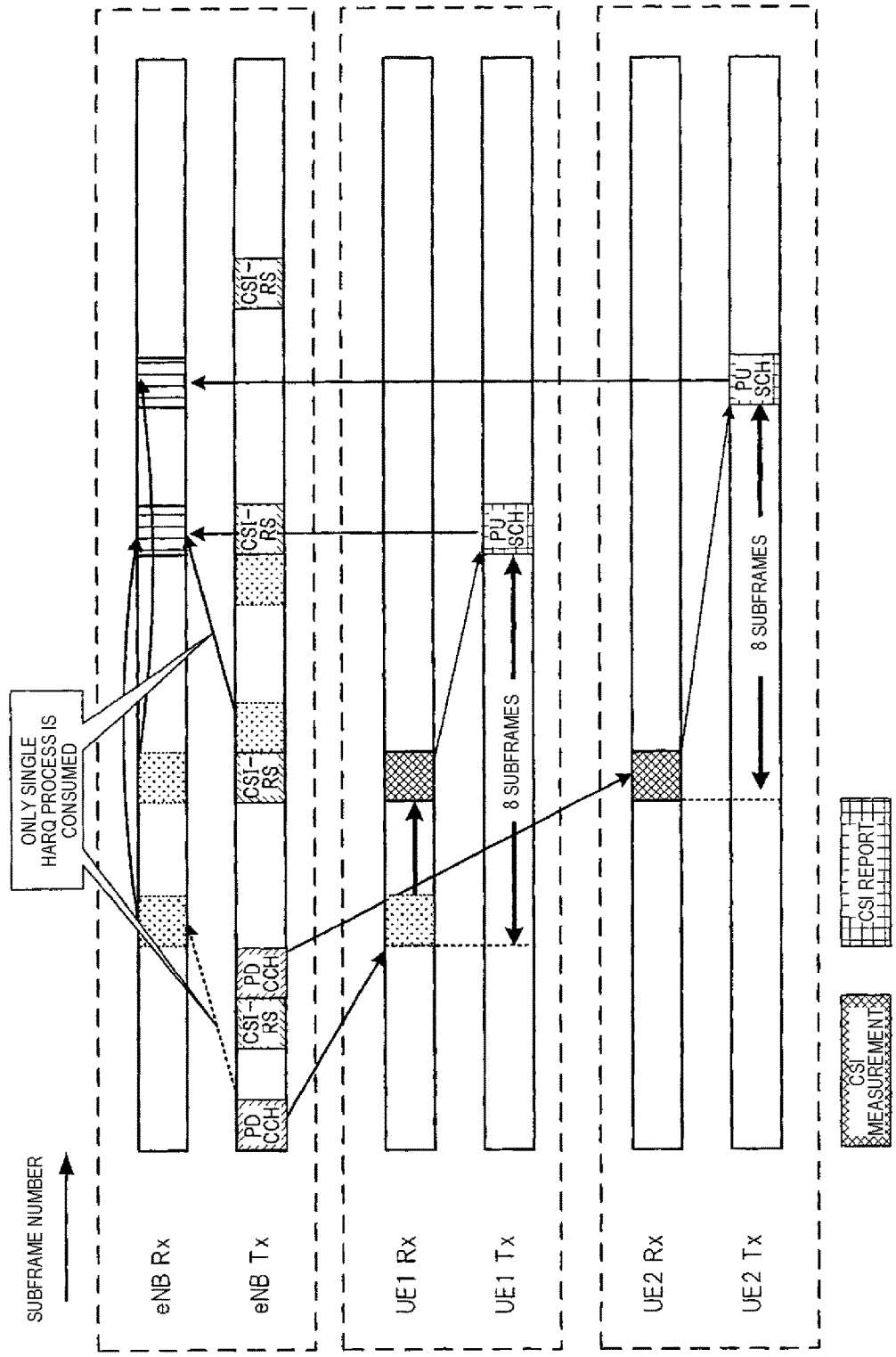
FIG. 5 is a diagram showing an operation relating to a CSI request and a CSI report in the second embodiment.

Next, the operations of the transmission apparatus and the reception apparatus in the second embodiment will be described in detail. FIG. 5 is a diagram showing an operation relating to a CSI request and a CSI report in the second embodiment. Here, as in the first embodiment, a case will be described where a CSI request is transmitted from a base station (eNB) serving as a transmission apparatus to two user equipments (UE1 and UE2) serving as a reception apparatus, and a CSI report is returned from each user equipment to the base station.

The transmission apparatus eNB sets a CSI report interval set value, which is a value common to a plurality of reception apparatuses belonging to the own apparatus, in advance in the CSI report interval setting section 440. Here, the CSI report interval set value is set to a value (in the example of the figure, 8 subframes) matched with a retransmission interval at the time of communication between a transmission apparatus and a reception apparatus in a wireless communication system. That is, the value is set such that the interval between a CSI request and a CSI report obtained by applying the CSI report interval set value is matched with the retransmission interval of an uplink data signal. The transmission interval of the reference signal CSI-RS to be discontinuously transmitted is set to, for example, a 10-subframes interval (10 msec interval). The configuration other than the CSI report interval set value is the same as in the first embodiment. With the above-described operation, from the viewpoint of the transmission apparatus eNB, it is possible to distribute the downlink control channel PDCCH for a CSI request in the time domain, and also to distribute the uplink data channel PUSCH which is allocated as a CSI report.

According to the second embodiment, as in the first embodiment, it is possible to suppress concentration of CSI requests and CSI reports at specific resources in the time domain and to prevent degradation in throughput. In the related art, a resource for a CSI report is allocated, such that an uplink data signal may not be allocated. In contrast, in the second embodiment, with the above-described CSI report interval setting and resource allocation, the operation to transmit a CSI report with respect to a CSI request can be regarded as the retransmission operation of an arbitrary data signal, thereby minimizing consumption of downlink control signals for uplink signal allocation.

Third Embodiment

In a third embodiment, a CSI request is transmitted from a transmission apparatus to each reception apparatus to be temporally distributed at the timing earlier than the transmission timing of the reference signal CSI-RS for CSI measurement. In this case, as a value indicating how many subframes a CSI request is transmitted to each reception apparatus earlier than CSI-RS, a CSI report offset is set to differ among the reception apparatuses. Each reception apparatus sets the timing delayed by the CSI report offset after a predefined report interval elapses from the reception timing of CSI-RS as the CSI report timing of the own apparatus on the basis of the CSI report offset. Each reception apparatus calculates CSI from the reference signal CSI-RS, and transmits the CSI report to the transmission apparatus at the CSI report timing of the own apparatus. The CSI report offset can be acquired from the difference between the reception timing of the CSI request and the reception timing of CSI-RS in the reception apparatus. The transmission timing of CSI-RS may be notified to the reception apparatus, and the CSI report offset may be acquired from the reception timing of the CSI request and the transmission timing of CSI-RS by each reception apparatus. The CSI report offset may be notified from the transmission apparatus to each reception apparatus. Thus, the timing at which the CSI request is transmitted and the timing at which the CSI report is transmitted are respectively distributed.

Figure 6:
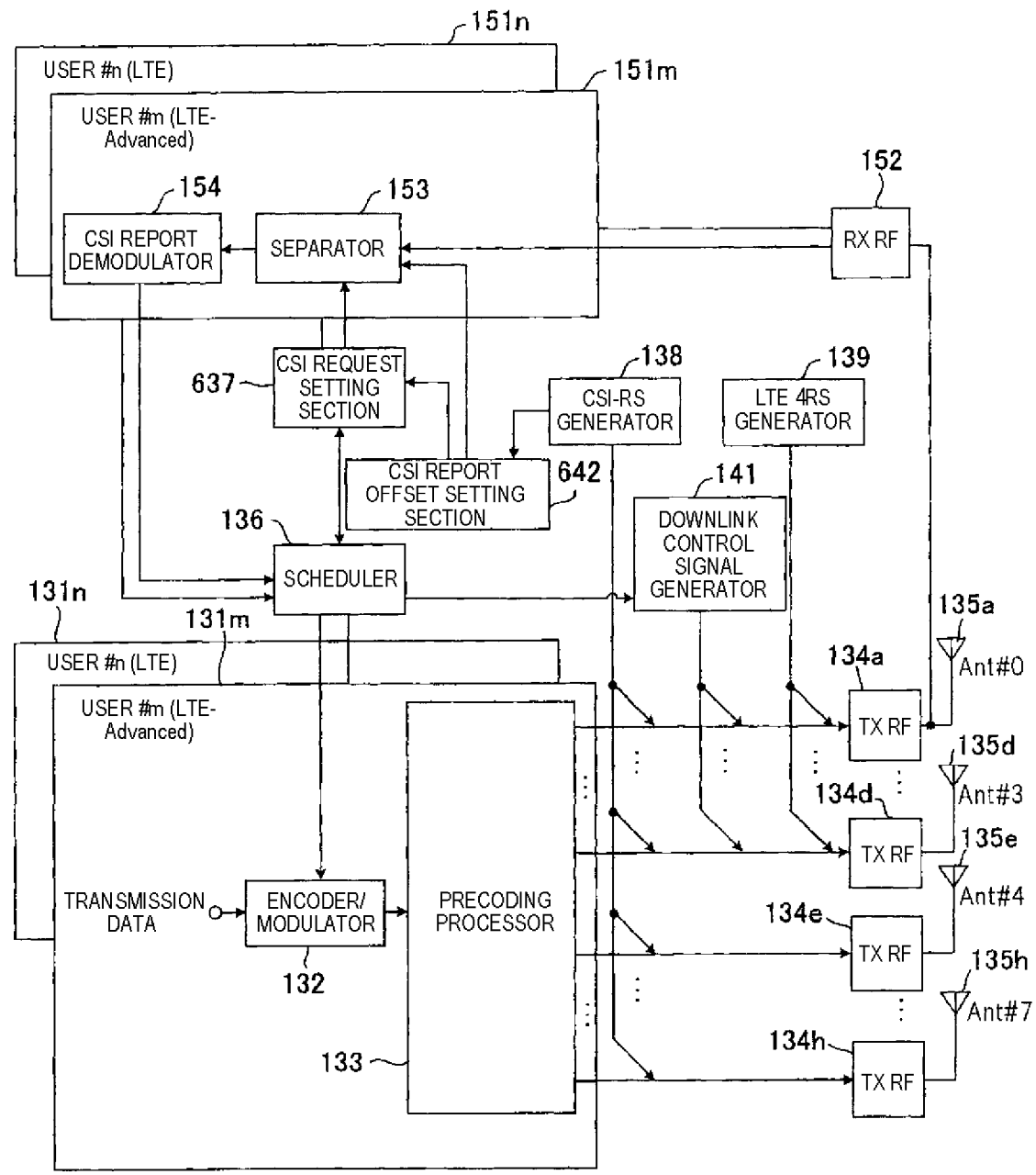
FIG. 6 is a block diagram showing the configuration of a main part of a transmission apparatus according to a third embodiment of the invention.
Figure 7:
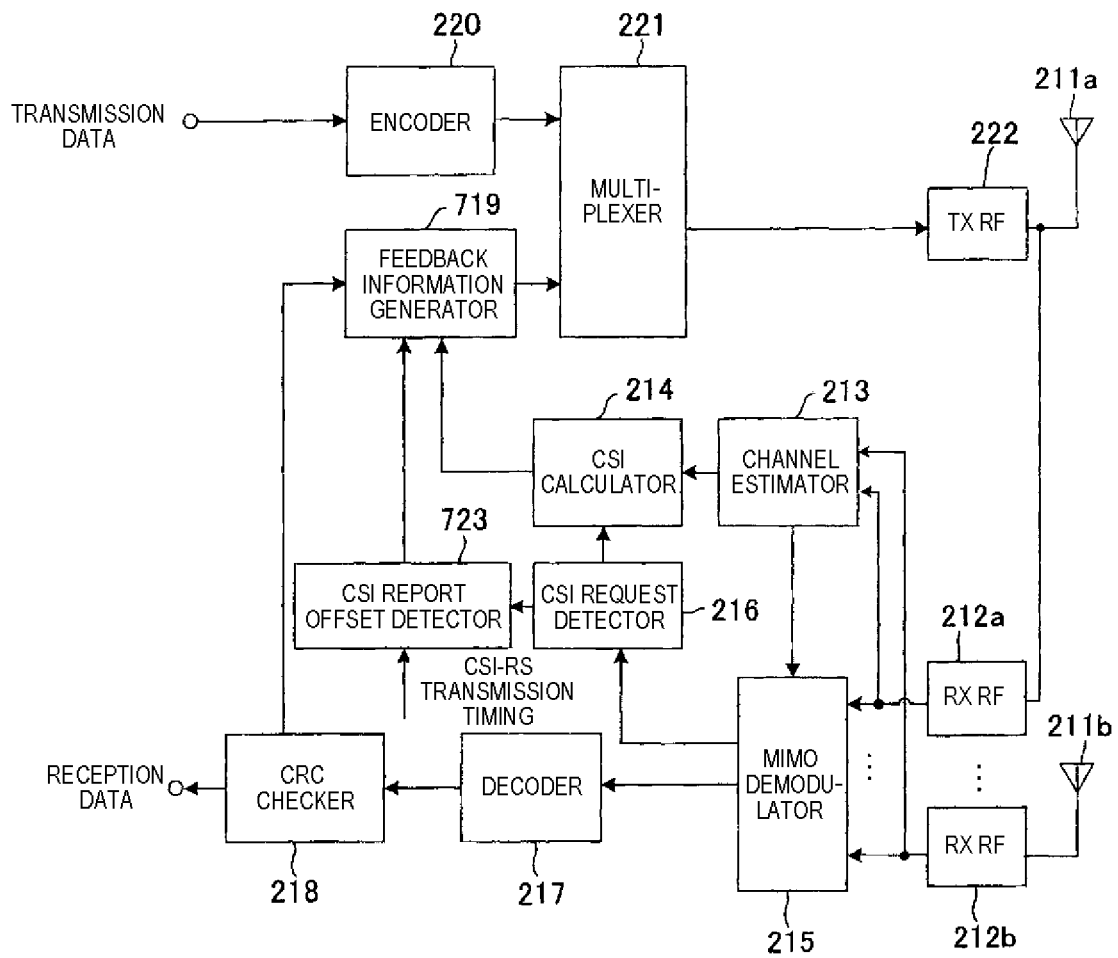
FIG. 7 is a block diagram showing the configuration of a main part of a reception apparatus according to the third embodiment of the invention.

FIG. 6 is a block diagram showing the configuration of a main part of a transmission apparatus according to a third embodiment of the invention. FIG. 7 is a block diagram showing the configuration of a main part of a reception apparatus according to the third embodiment of the invention. In the figures, the same constituent elements as those in the first embodiment are represented by the same reference numerals. Description will be mainly provided focusing on portions different from the first embodiment, and description of the same portions will be omitted.

The transmission apparatus of the third embodiment includes a CSI report offset setting section 642, and the operation of a CSI request setting section 637 is different from the first embodiment. The CSI report offset setting section 642 sets a different integer value for each reception apparatus as a CSI report offset. The CSI report offset setting section 642 instructs a subframe earlier than the CSI-RS transmission timing received from the CSI-RS generator 138 by the CSI report offset as the CSI request transmission timing to the CSI request setting section 637 on the basis of the set value of the CSI report offset. In the example of UE1 in FIG. 8 described below, the CSI request transmission timing is before 2 subframes. The CSI-RS generator 138 notifies the CSI-RS transmission timing to each reception apparatus regularly through a notification channel or the like. The CSI report offset setting section 642 instructs the interval between the subframe, in which the CSI request is transmitted, and the subframe, in which the CSI report is transmitted, based on the value of the CSI report offset to the separator 153 of the relevant UE. In the example of UE1 in FIG. 8 described below, the subframe interval is 2×2=4 subframes.

The CSI request setting section 637 sends a notification to the scheduler 136 to generate a control signal of a CSI request for UE in a subframe of the indicated CSI request transmission timing of the CSI report offset setting section 642. The separator 153 obtains information regarding the CSI request transmission timing from the CSI request setting section 637, receives the value of the subframe interval from the CSI request to the CSI report from the CSI report offset setting section 642, and recognizes the timing of a subframe in which the CSI report is transmitted from the relevant UE. The separator 153 cuts the CSI report from the reception signal in the relevant subframe, and outputs the CSI report to the CSI report demodulator 154.

The reception apparatus of the third embodiment includes a CSI report offset detector 723, and the operation of a feedback information generator 719 is different from the first embodiment. The CSI request detector 216 receives a demodulated signal output from the MIMO demodulator 215 as input, detects a CSI request signal, and notifies the detection result to the CSI calculator 214 and the CSI report offset detector 723. When an indication that a CSI request signal is detected is indicated from the CSI request detector 216, the CSI report offset detector 723 acquires the CSI report offset from the difference between the separately notified CSI-RS transmission timing and the CSI request reception timing. The CSI report offset detector 723 outputs the CSI report offset set value to the feedback information generator 719. In the example of UE1 in FIG. 8 described below, the CSI report offset is 2 subframes. In the CSI report offset detector 723, the CSI report offset may be calculated and acquired from the difference between the CSI request reception timing and the CSI-RS reception timing.

The feedback information generator 719 generates feedback information including the CSI report value calculated by the CSI calculator 214 and outputs the feedback information to the multiplexer 221. At this time, the feedback information generator 719 generates a signal as feedback information in a subframe delayed by the CSI report offset set value notified from the CSI report offset detector 723 after a predefined report interval elapses from the reception timing of CSI-RS. Here, the predefined report interval from the reception timing of CSI-RS is set to, for example, the number $n_{CSI-RS}$ of subframes which is determined for the reason from the viewpoint of a CSI report due to the amount of processing in the user equipment. If it is necessary to transmit the decoding result (Ack/Nack) of downlink data in the relevant subframe, the feedback information generator 719 synthesizes the CSI report value and the Ack/Nack information, and outputs the result to the multiplexer 221.

Figure 8:
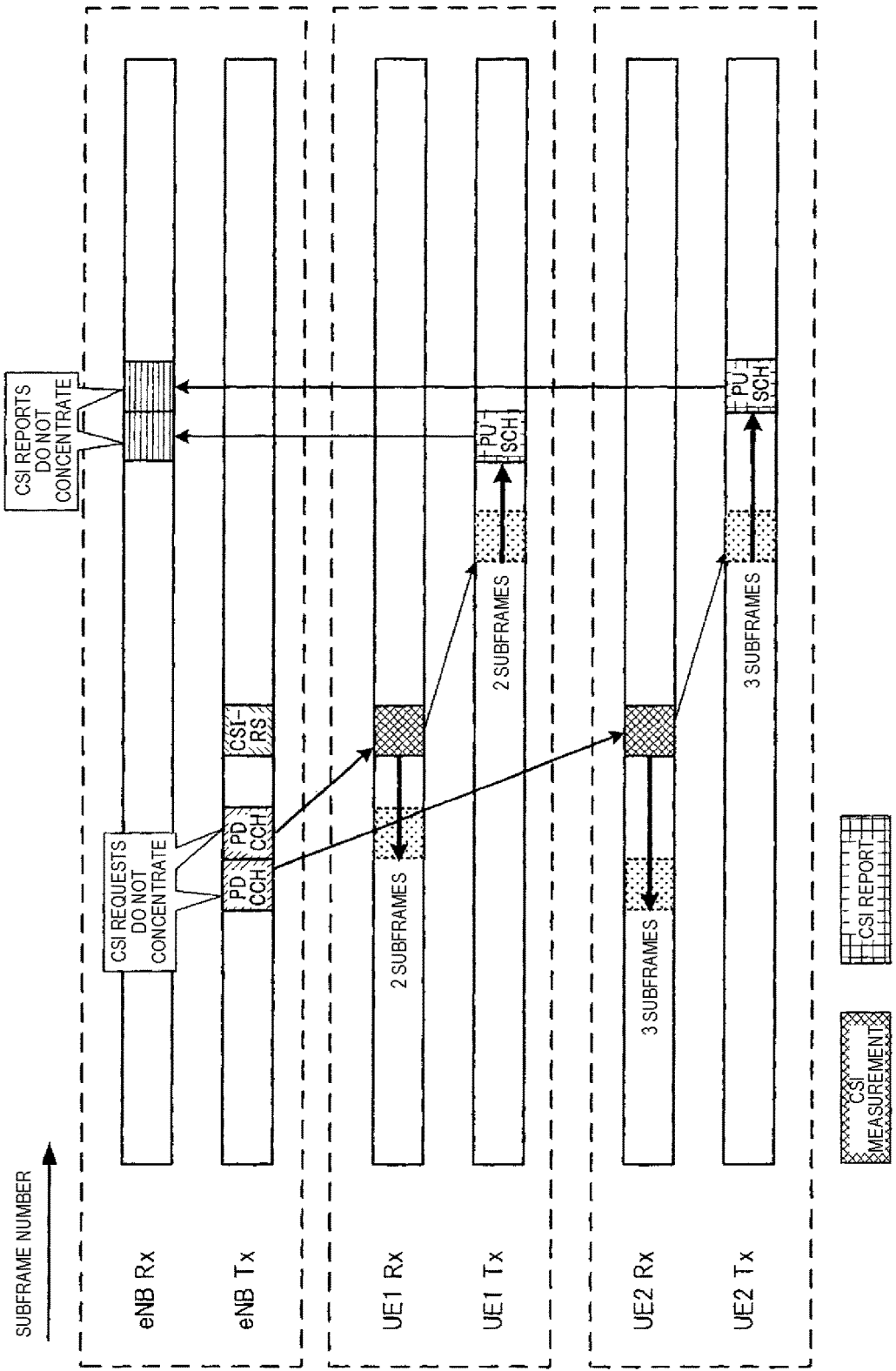
FIG. 8 is a diagram showing an operation relating to a CSI request and a CSI report in the third embodiment.

Next, the operations of the transmission apparatus and the reception apparatus in the third embodiment will be described in detail. FIG. 8 is a diagram showing an operation relating to a CSI request and a CSI report in the third embodiment. Here, as in the first embodiment, a case will be described where a CSI request is transmitted from a base station (eNB) serving as a transmission apparatus to two user equipments (UE1 and UE2) serving as a reception apparatus, and a CSI report is returned from each user equipment to the base station.

The transmission apparatus eNB outputs an instruction of a CSI request to the reception apparatuses UE1 and UE2 to be distributed over the reception apparatuses at the timing earlier than CSI-RS by the user equipment transmission signal processor 131*m*. At this time, in the CSI report offset setting section 642, an integer value is set as the CSI report offset for the relevant reception apparatus, and the CSI request is transmitted in a subframe earlier than CSI-RS by the CSI report offset. A reception apparatus UE which meets the CSI request determines the set value of the CSI report offset from the subframe in which PDCCH including the CSI request is detected and the transmission timing of CSI-RS notified previously, and specifies the CSI report subframe of the own apparatus.

In the example of FIG. 8, the transmission apparatus eNB instructs a CSI request to the reception apparatus UE1 in PDCCH earlier than CSI-RS by 2 subframes, and the reception apparatus UE1 receives the CSI request. If the CSI request is detected, the reception apparatus UE1 transmits a CSI report to the transmission apparatus eNB using a subframe after the number (for example, $n_{CSI-RS}$) of subframes of a predefined report interval from the transmission timing of CSI-RS and 2 subframes. Similarly, the transmission apparatus eNB instructs a CSI request to the reception apparatus UE2 in PDCCH earlier than CSI-RS by 3 subframes, and the reception apparatus UE2 receives the CSI request. The reception apparatus UE2 transmits a CSI report to the transmission apparatus eNB after the number of subframes of a predefined report interval from the transmission timing of CSI-RS and 3 subframes. With the above-described configuration, from the viewpoint of the transmission apparatus eNB, it is possible to distribute the downlink control channel PDCCH for a CSI request in the time domain, and also to distribute the uplink data channel PUSCH which is allocated as a CSI report.

As described above, in the third embodiment, the timing at which the CSI request is transmitted from the transmission apparatus to each reception apparatus is distributed at the timing earlier than CSI-RS on the basis of the CSI report offset set in each reception apparatus. The CSI report is transmitted from each reception apparatus to the transmission apparatus at the timing delayed by the CSI report offset after the predefined report interval elapses from the transmission timing of CSI-RS. Thus, as in the first embodiment, it is possible to suppress concentration of CSI requests and CSI reports at specific resources in the time domain and to prevent degradation in throughput.

Fourth Embodiment

In a fourth embodiment, a CSI request is transmitted from a transmission apparatus to each reception apparatus to be temporally distributed simultaneously with or earlier than the transmission timing of the reference signal CSI-RS for CSI measurement. Each reception apparatus sets the timing delayed by a CSI report offset after a predefined report interval elapses from the reception timing of CSI-RS on the basis of the CSI report offset using a value uniquely determined by a parameter depending on each reception apparatus. Each reception apparatus calculates CSI from the reference signal CSI-RS, and transmits the CSI report to the transmission apparatus at the CSI report timing of the own apparatus. The CSI report offset can be calculated and acquired using a calculation expression set and notified in advance in the transmission apparatus and the reception apparatus. Thus, the timing at which the CSI request is transmitted and the timing at which the CSI report is transmitted are respectively distributed.

Figure 9:
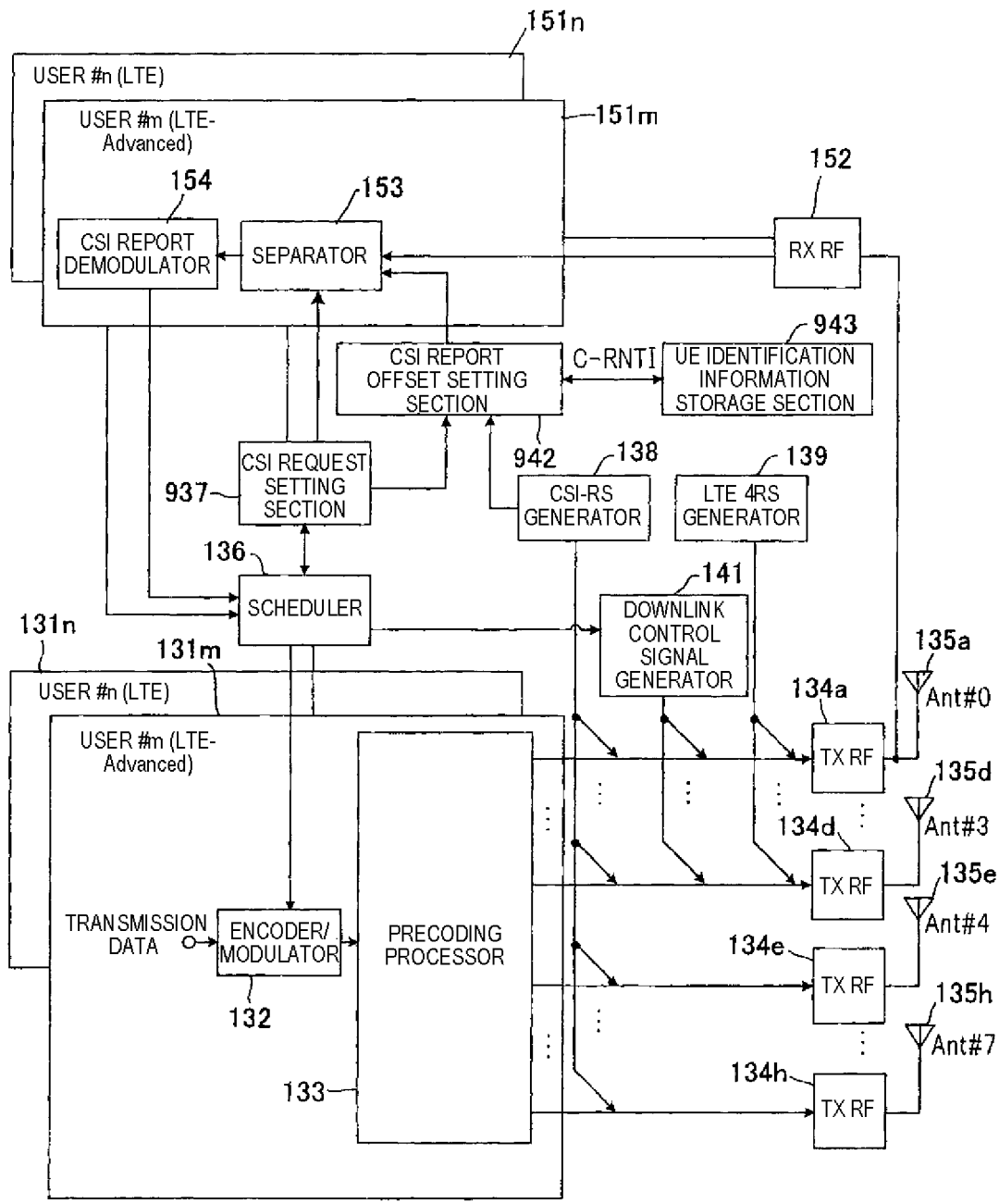
FIG. 9 is a block diagram showing the configuration of a main part of a transmission apparatus according to a fourth embodiment of the invention.
Figure 10:
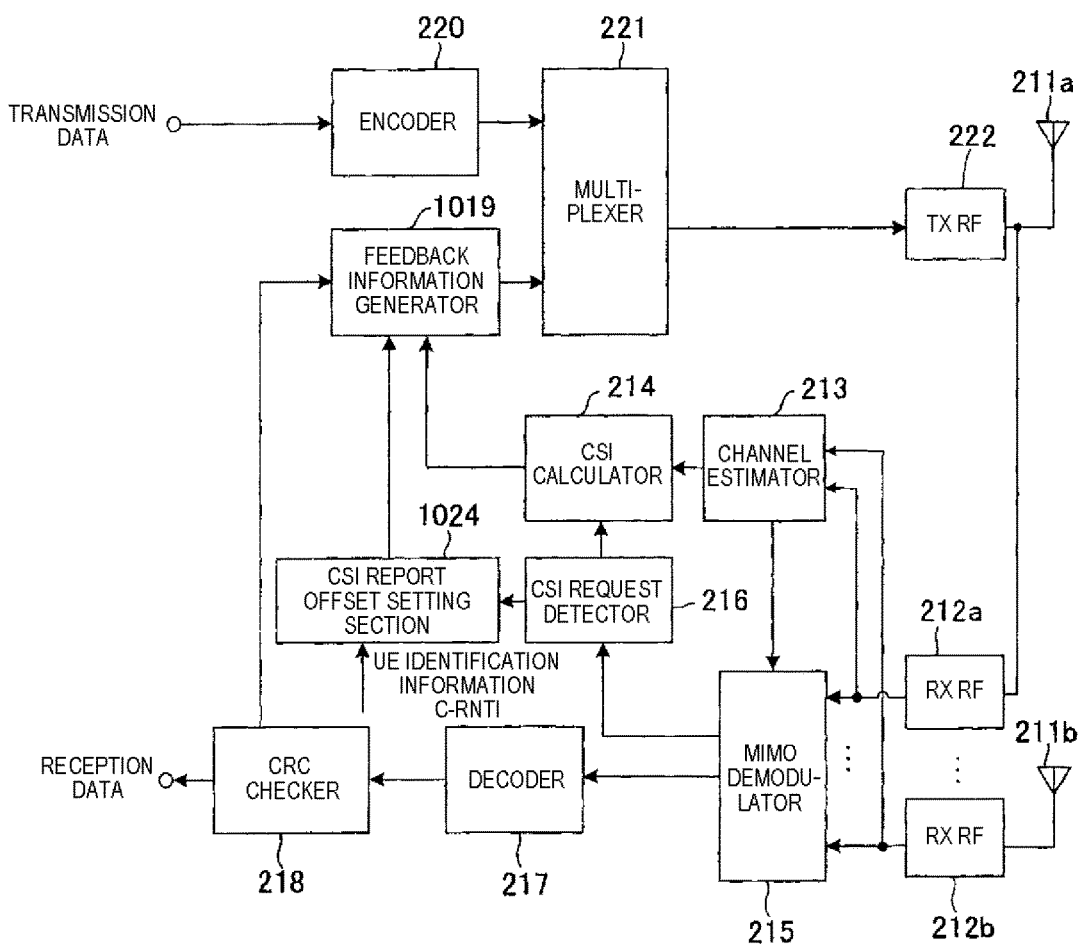
FIG. 10 is a block diagram showing the configuration of a main part of a reception apparatus according to the fourth embodiment of the invention.

FIG. 9 is a block diagram showing the configuration of a main part of a transmission apparatus according to a fourth embodiment of the invention. FIG. 10 is a block diagram showing the configuration of a main part of a reception apparatus according to the fourth embodiment of the invention. In the figures, the same constituent elements as those in the first embodiment are represented by the same reference numerals. Description will be mainly provided focusing on portions different from the first embodiment, and description of the same portions will be omitted.

The transmission apparatus of the fourth embodiment includes a CSI report offset setting section 942 and a user equipment identification information storage section 943, and the operation of a CSI request setting section 937 is different from the first embodiment. Here, an example will be described where user equipment identification information is used as the parameter depending on each reception apparatus, and an identification number C-RNTI of a user equipment which is provided when a reception apparatus belongs to the relevant transmission apparatus is used as the user equipment identification information. The CSI report offset setting section 942 defines a calculation expression for obtaining the CSI report offset from the user equipment identification information (identification number C-RNTI) in advance. The calculation expression and the identification number C-RNTI are notified to each reception apparatus through a notification channel or the like. The CSI request setting section 937 sets the CSI request transmission timing to each reception apparatus, and notifies setting information of the CSI request transmission timing to the CSI report offset setting section 942 and each user equipment reception signal processor. The CSI request setting section 937 sends a notification to the scheduler 136 to generate a control signal of a CSI request for UE in the subframe of the set CSI request transmission timing.

The CSI report offset setting section 942 receives the identification number C-RNTI of the relevant reception apparatus from the user equipment identification information storage section 943, and sets the CSI report offset for each reception apparatus on the basis of the defined calculation expression. The CSI report offset setting section 942 instructs a subframe, in which a CSI report is transmitted, based on the set CSI report offset and the CSI-RS transmission timing received from the CSI-RS generator 138 to the separator 153 of the relevant UE.

The reception apparatus of the fourth embodiment includes a CSI report offset setting section 1024, and the operation of a feedback information generator 1019 is different from the first embodiment. The CSI request detector 216 receives a demodulated signal output from the MIMO demodulator 215 as input, detects a CSI request signal, and notifies the detection result to the CSI calculator 214 and the CSI report offset setting section 1024. The CSI report offset setting section 1024 calculates and acquires a CSI report offset on the basis of the identification number C-RNTI of the own apparatus using a calculation expression separately notified from the transmission apparatus through a notification channel or the like. The CSI report offset setting section 1024 outputs the calculated CSI report offset to the feedback information generator 1019. In the example of UE1 in FIG. 11 described below, the CSI report offset is 1 subframe.

The feedback information generator 1019 generates feedback information including the CSI report value calculated by the CSI calculator 214 and outputs the feedback information to the multiplexer 221. At this time, the feedback information generator 1019 generates a signal as feedback information in a subframe delayed by the CSI report offset depending on the user equipment notified from the CSI report offset setting section 1024 after a predefined report interval elapses from the reception timing of CSI-RS. Here, the predefined report interval from the reception timing of CSI-RS is set to, for example, the number $n_{CSI-RS}$ of subframes which is determined for the reason from the viewpoint of a CSI report due to the amount of processing in the user equipment. If the decoding result (Ack/Nack) of downlink data is transmitted in the relevant subframe, the feedback information generator 1019 synthesizes the CSI report value and the Ack/Nack information, and outputs the result to the multiplexer 221.

Figure 11:
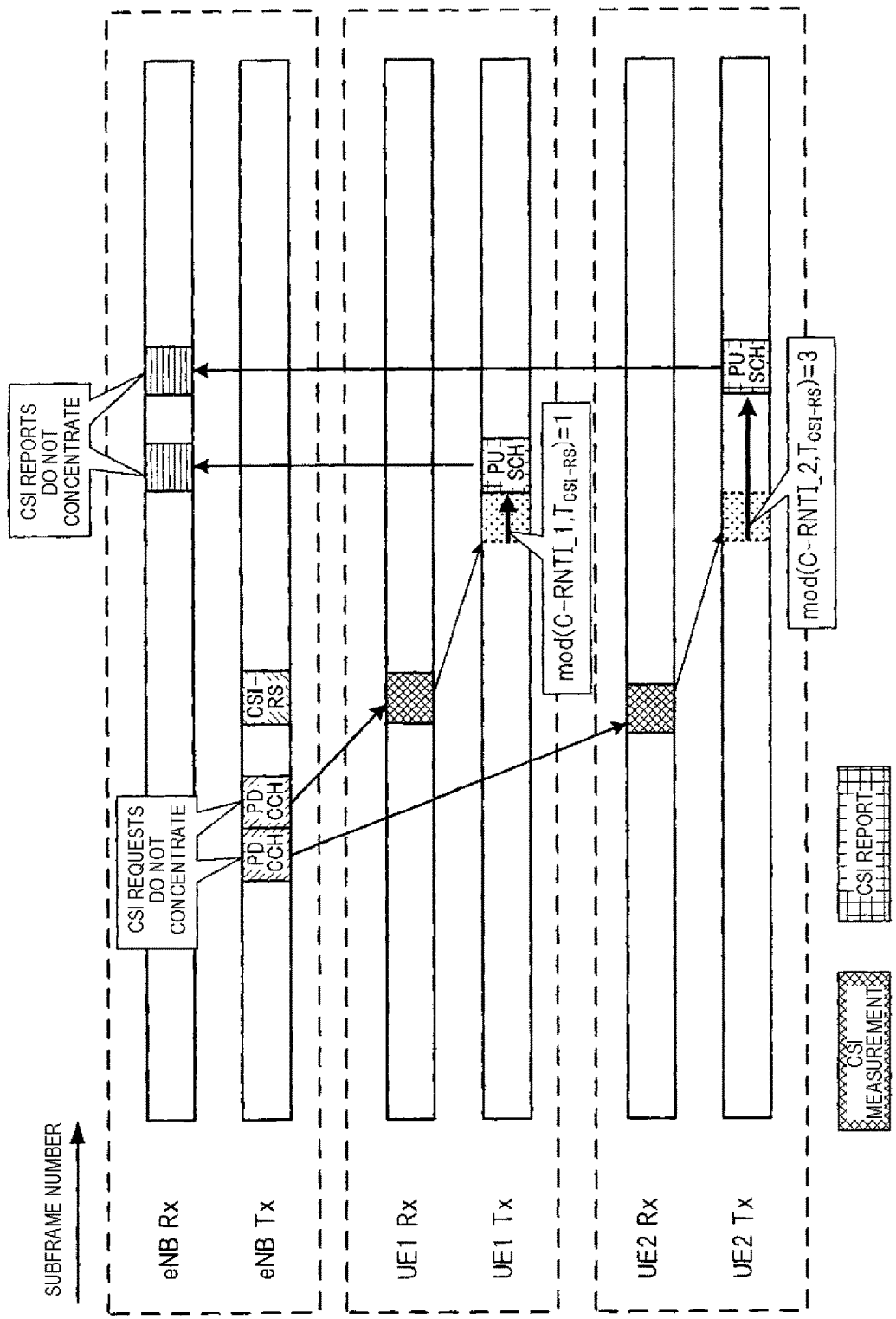
FIG. 11 is a diagram showing an operation relating to a CSI request and a CSI report in the fourth embodiment.

Next, the operations of the transmission apparatus and the reception apparatus in the fourth embodiment will be described in detail. FIG. 11 is a diagram showing an operation relating to a CSI request and a CSI report in the fourth embodiment. Here, as in the first embodiment, a case will be described where a CSI request is transmitted from a base station (eNB) serving as a transmission apparatus to two user equipments (UE1 and UE2) serving as a reception apparatus, and a CSI report is returned from each user equipment to the base station.

The transmission apparatus eNB notifies the calculation expression for obtaining the set value of the CSI report offset by the parameter depending on each reception apparatus to a plurality of reception apparatuses belonging to the own apparatus. Here, as the parameter, the identification number C-RNTI which is provided when each reception apparatus belongs to the relevant transmission apparatus is used. The calculation expression is, for example, mod(C-RNTI_x, TCSI-RS). Here, C-RNTI_x is the identification number which is provided for UEx, and TCSI-RS is the transmission interval of CSI-RS.

The transmission apparatus eNB outputs an instruction of a CSI request to the reception apparatuses UE1 and UE2 to be distributed over the reception apparatuses at the timing earlier than CSI-RS by the user equipment transmission signal processor 131m. At this time, the CSI request transmission timing to each reception apparatus may be set on the basis of the CSI report offset for each reception apparatus or may be arbitrarily set. A reception apparatus UE which meets the CSI request calculates the set value of the CSI report offset using the calculation expression notified previously, and specifies the CSI report subframe of the own apparatus on the basis of the CSI report offset.

In the example of FIG. 11, the reception apparatus UE1 acquires 1 subframe, which is the CSI report offset of the own apparatus, by the calculation expression, and transmits a CSI report to the transmission apparatus eNB using a subframe after the number (for example, $n_{CSI-RS}$) of subframes of the predefined report interval from the transmission timing of CSI-RS and 1 subframe. Similarly, the reception apparatus UE2 acquires 3 subframes which are the CSI report offset of the own apparatus, and transmits a CSI report to the transmission apparatus eNB using a subframe after the number of subframes of the predefined report interval from the transmission timing of CSI-RS and 3 subframes. With the above-described operation, from the viewpoint of the transmission apparatus eNB, it is possible to distribute the downlink control channel PDCCH for a CSI request in the time domain and also to distribute the uplink data channel PUSCH which is allocated as a CSI report.

As described above, in the fourth embodiment, the timing at which the CSI request is transmitted from the transmission apparatus to each reception apparatus is distributed at the timing simultaneously with or earlier than CSI-RS. The CSI report is transmitted from each reception apparatus to the transmission apparatus at the timing delayed by the CSI report offset after the predefined report interval elapses from the transmission timing of CSI-RS on the basis of the CSI report offset using a value uniquely determined by the parameter depending on each reception apparatus. Thus, as in the first embodiment, it is possible to suppress concentration of CSI requests and CSI reports at specific resources in the time domain and to prevent degradation in throughput.

As described above, in this embodiment, the transmission subframe of the reference signal for channel quality measurement is associated with the transmission subframe of the channel quality request, and the channel quality request is transmitted simultaneously with or before the reference signal and reflected in setting the transmission subframe of the channel quality report. Thus, it is possible to suppress concentration of channel quality requests and channel quality reports and to prevent degradation in throughput. Therefore, in a cellular system, it becomes possible to realize high-order MIMO of a multi-antenna system, coordinated multiple-point transmission and reception, and the like with satisfactory characteristics.

Fifth Embodiment

In a fifth embodiment, a CSI request is transmitted from a transmission apparatus to each reception apparatus to be temporally distributed simultaneously with or earlier than the transmission timing of the reference signal CSI-RS for CSI measurement. Each reception apparatus determines the CSI report timing of the own apparatus on the basis of a CSI report offset using a value uniquely determined by a parameter depending on each reception apparatus. In this case, the CSI report timing of the own apparatus is set to the timing delayed by the CSI report offset after a predefined report interval elapses from the timing at which 1 set of CSI-RS is received from a start point as the measurement start point of CSI-RS according to the level of a propagation loss between the transmission apparatus and the reception apparatus reported to the transmission apparatus by the own apparatus from among a plurality of CSI-RS. Each reception apparatus calculates CSI from a plurality of reference signals CSI-RS, and transmits a CSI report to the transmission apparatus at the CSI report timing of the own apparatus. The CSI report offset can be calculated and acquired using a calculation expression set and notified in advance in the transmission apparatus and the reception apparatus. Thus, the timing at which the CSI request is transmitted and the timing at which the CSI report is transmitted respectively are distributed.

Figure 12:
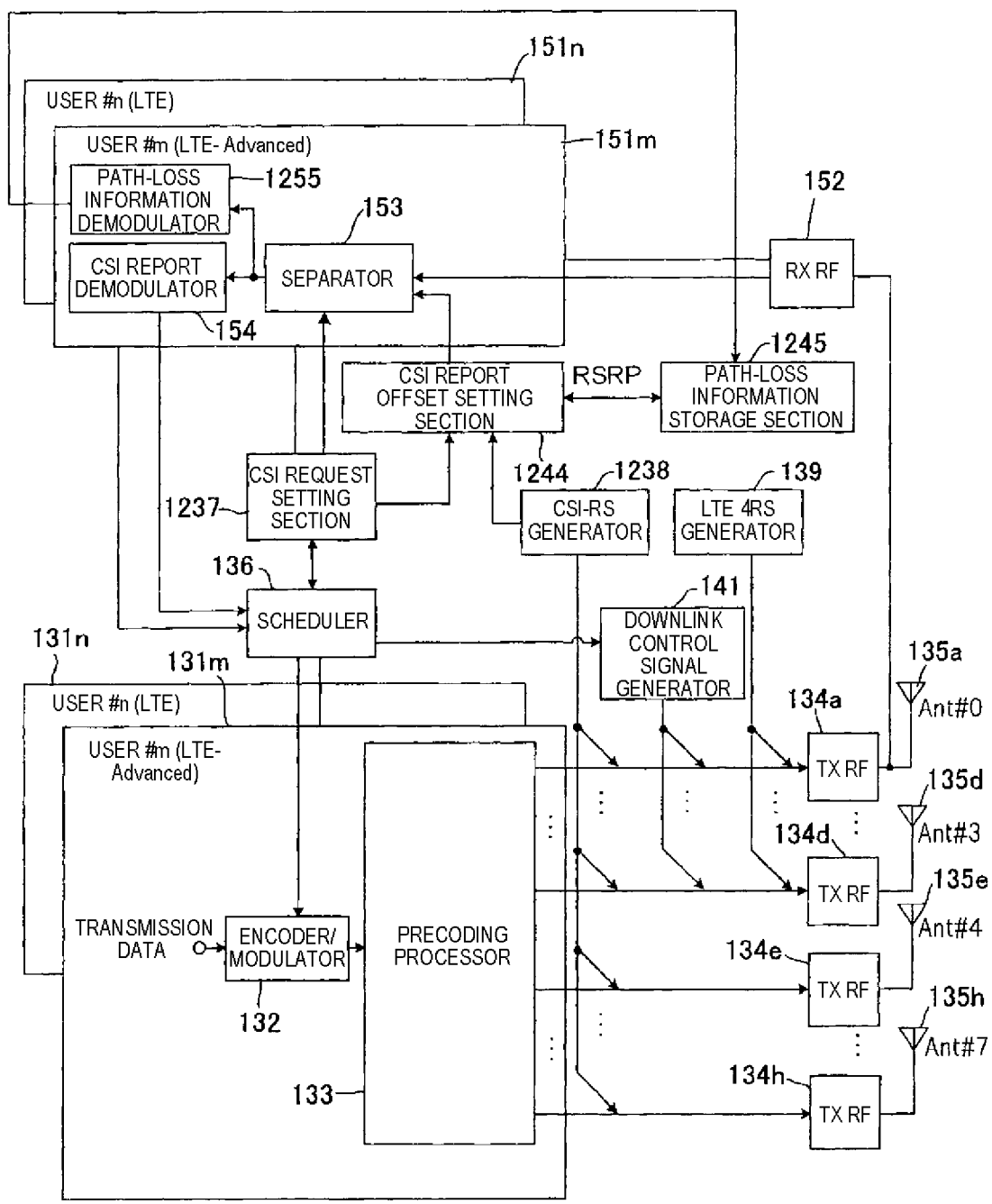
FIG. 12 is a block diagram showing the configuration of a main part of a transmission apparatus according to a fifth embodiment of the invention.
Figure 13:
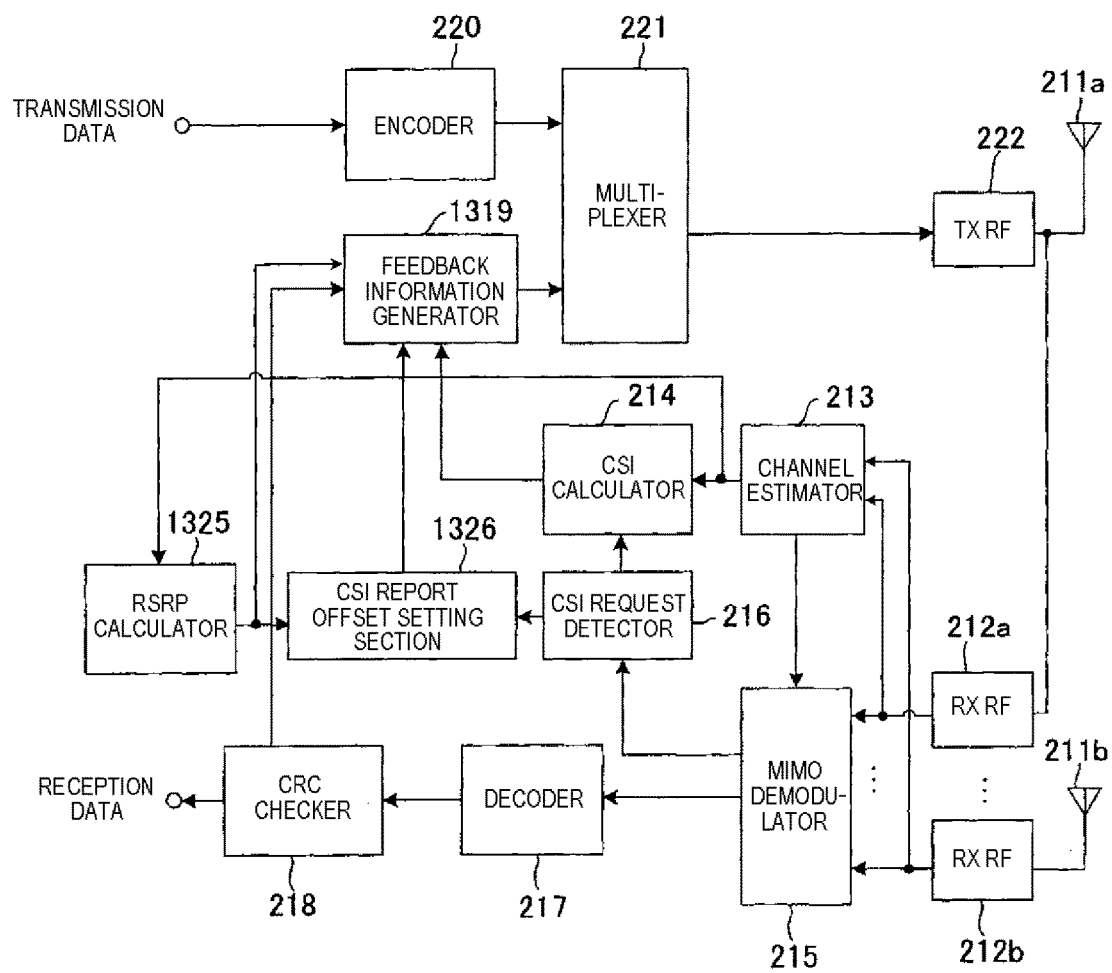
FIG. 13 is a block diagram showing the configuration of a main part of a reception apparatus according to the fifth embodiment of the invention.

FIG. 12 is a block diagram showing the configuration of a main part of a transmission apparatus according to a fifth embodiment of the invention. FIG. 13 is a block diagram showing the configuration of a main part of a reception apparatus according to the fifth embodiment of the invention. In the figure, the same constituent elements as those in the first embodiment are represented by the same reference numerals. Description will be mainly provided focusing on portions different from the first embodiment, and description of the same portions will be omitted.

The transmission apparatus of the fifth embodiment includes a path-loss information demodulator 1255, a CSI report offset setting section 1244, and a path-loss information storage section 1245, and the operations of a CSI-RS generator 1238 and a CSI request setting section 1237 are different from the first embodiment. Here, an example will be described where the CSI-RS generator 1238 transmits CSI-RS corresponding to a specific antenna in each subframe using 2 continuous subframes, and a path-loss information is used as the parameter depending on each reception apparatus. An example will be described where reference signal received power (RSRP) which is reported to the transmission apparatus for determining the need for handover by the reception apparatus is used as the path-loss information.

The CSI-RS generator 1238 transmits CSI-RS corresponding to Ant#0 to Ant#3 in the subframe of the earlier timing from among 2 continuous subframes, and transmits CSI-RS corresponding to Ant#4 to Ant#7 in the subframe of the later timing. The CSI report offset setting section 1244 defines a threshold value for comparison with path-loss information to obtain the CSI report offset in advance. The threshold value is notified to each reception apparatus through a notification channel or the like. The CSI request setting section 1237 sets the CSI request transmission timing to each reception apparatus, and notifies setting information of the CSI request transmission timing to the CSI report offset setting section 1244 and each user equipment reception signal processor. The CSI request setting section 1237 sends a notification to the scheduler 136 to generate a control signal of a CSI request for UE in the subframe of the set CSI request transmission timing.

The path-loss information storage section 1245 receives and stores the path-loss information received from the relevant user equipment extracted by the path-loss information demodulator 1255. The CSI report offset setting section 1244 receives the path-loss information reported from the path-loss information storage section 1245 to the relevant reception apparatus, and sets the CSI report offset for each reception apparatus on the basis of the magnitude relationship with the defined threshold value. The CSI report offset setting section 1244 instructs a subframe, in which the CSI report is transmitted, based on the set CSI report offset and the CSI-RS transmission timing received from the CSI-RS generator 1238 to the separator 153 of the relevant UE.

The reception apparatus of the fifth embodiment includes a RSRP calculator 1325 and a CSI report offset setting section 1326, and the operation of a feedback information generator 1319 is different from the first embodiment. The RSRP calculator 1325 measures received power of the reference signal using the channel estimation value received from the channel estimator 213, and outputs the received power of the reference signal to the feedback information generator 1319 and the CSI report offset setting section 1326 as RSRP. The CSI report offset setting section 1326 uses the threshold value separately notified from the transmission apparatus through a notification channel or the like, and acquires the CSI report offset calculated from the magnitude relationship with the measured RSRP. The CSI report offset setting section 1326 outputs the calculated CSI report offset to the feedback information generator 1319. In the example of UE1 of FIG. 14 described below, the CSI report offset is 2 subframes.

Figure 14:
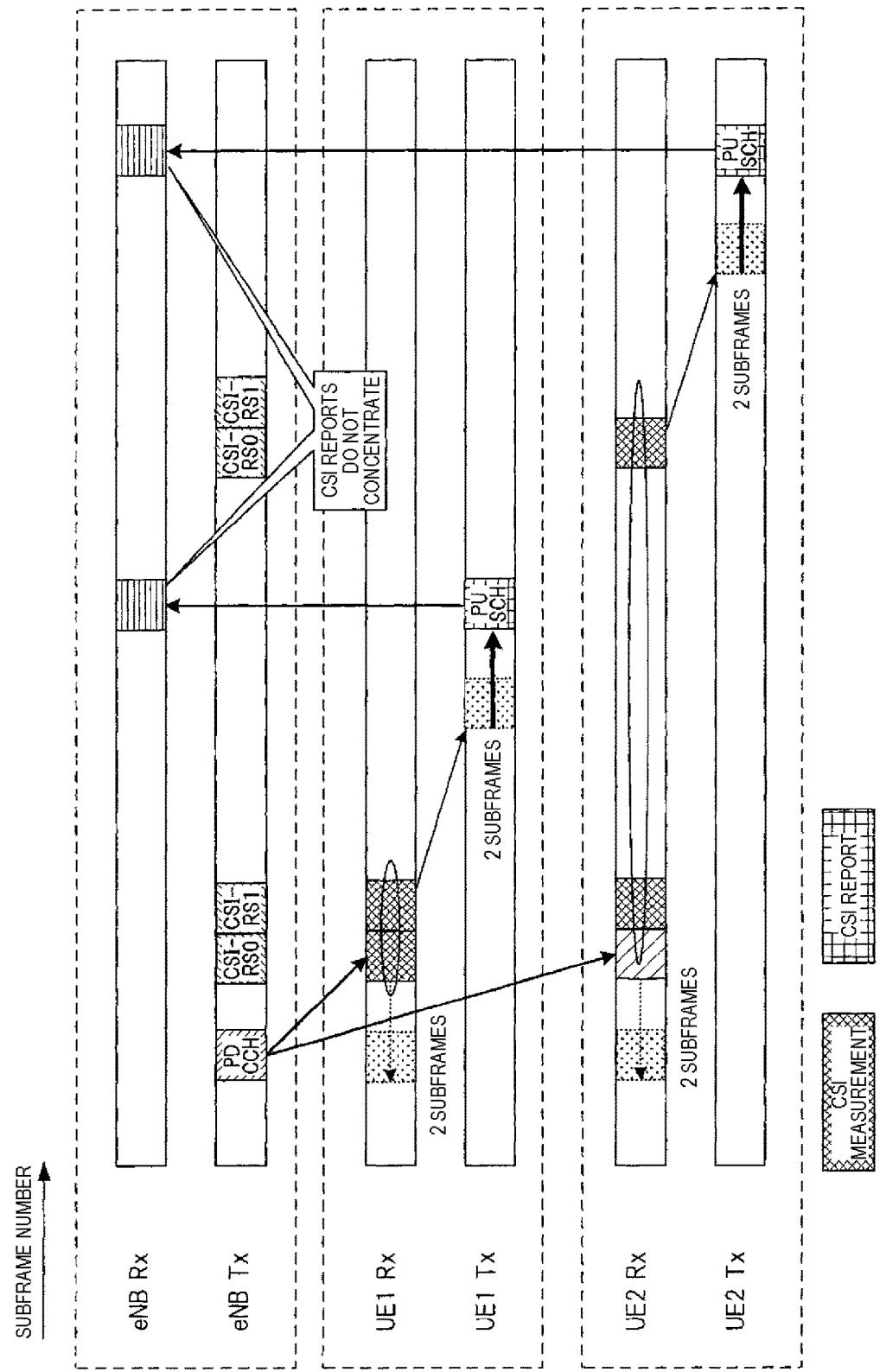
FIG. 14 is a diagram showing an operation relating to a CSI request and a CSI report in the fifth embodiment.

Next, the operations of the transmission apparatus and the reception apparatus in the fifth embodiment will be described in detail. FIG. 14 is a diagram showing an operation relating to a CSI request and a CSI report in the fifth embodiment. Here, as in the first embodiment, a case will be described where a CSI request is transmitted from a base station (eNB) serving as a transmission apparatus to two user equipments (UE1 and UE2) serving as a reception apparatus, and a CSI report is returned from each user equipment to the base station.

The transmission apparatus eNB notifies the threshold value for obtaining the set value of the CSI report offset by the measured path-loss information of each reception apparatus to a plurality of reception apparatuses belonging to the own apparatus. Here, RSRP is used as the path-loss information.

The transmission apparatus eNB outputs an instruction of a CSI request to the reception apparatuses UE1 and UE2 to be distributed over the reception apparatuses at the timing earlier than CSI-RS by the user equipment transmission signal processor 131$m$. At this time, the CSI request transmission timing to each reception apparatus may be set on the basis of the CSI report offset for each reception apparatus or may be arbitrarily set. A reception apparatus UE which meets the CSI request calculates the set value of the CSI report offset using the threshold value notified previously, and specifies the CSI report subframe of the own apparatus on the basis of the CSI report offset.

It is assumed that, in a state where the transmission apparatus eNB sets the threshold value smaller than the maximum value of RSRP by 15 dB, it is measured in UE1 that the measured value of RSRP is a value (RSRP maximum value-10 dB) greater than the threshold value, it is measured in UE2 that the measured value of RSRP is a value (RSRP maximum value-25 dB) smaller than the threshold value, and the measurement results are reported to the transmission apparatus eNB. At this time, in UE1, since the value is greater than the threshold value, 1 set of CSI-RS (in FIG. 14, 2 continuous subframes) with CSI-RS immediately after receiving an instruction of a CSI request as a start point is measured. A CSI report is transmitted to the transmission apparatus eNB using a subframe after the number of subframes (for example, NCSI-RS) of a predefined report interval from when 1 set of CSI-RS is measured and 2 subframes. In contrast, in UE2, since the value is smaller than the threshold value, a set of CSI-RS (in FIG. 14, 2 subframes which are transmitted at an interval) is measured with CSI-RS after CSI-RS transmission turns aside once immediately after receiving the instruction of the CSI request as a start point. A CSI report is transmitted to the transmission apparatus eNB using a subframe after the subframes of the predefined report interval from when 1 set of CSI-RS is measured, as in UE1, and 2 subframes.

With the above-described operation, from the viewpoint of the transmission apparatus eNB, it is possible to distribute the downlink control channel PDCCH for a CSI request in the time domain, and also to distribute the uplink data channel PUSCH which is allocated as a CSI report. In a user equipment which has RSRP information greater than a predefined threshold value, and performs high-speed data transmission at a higher rank, a plurality of CSI-RS can be received at as close timing as possible, and the influence of measurement delay when measuring in a plurality of subframes can be reduced at the time of transmission with a high rank. In a user equipment which has RSRP information smaller than a predefined threshold value, and performs data transmission at a lower rank, the CSI report timing can be controlled assuming that delay accompanied by measurement is allowable. That is, in this embodiment, it is possible to spatially the timing at which the CSI report is transmitted between a plurality of user equipments. As described above, according to the fifth embodiment, it is possible to distribute CSI requests and CSI reports in the time domain without causing degradation in throughput.

Although an example has been described where CSI-RS is transmitted using 2 continuous subframes, the invention is not limited thereto. It should suffice that 1 set of definitions based on path-loss information can be determined uniquely using a plurality of CSI-RS transmission subframes. As a determination method, a prenotification may be made as notification information, and the shortest interval when a plurality of CSI-RS transmission subframes are transmitted at irregular intervals may be regarded as a start point.

Although an example has been described where CSI-RS corresponding to Ant#0 to Ant#3 is transmitted in the subframe of the earlier timing from among 2 continuous subframes, and CSI-RS corresponding to Ant#4 to Ant#7 is transmitted in the subframe of the later timing, the invention is not limited thereto. CSI-RS may be transmitted using 2 subframes in accordance with the even-numbered and odd-numbered Ant numbers.

Although an example has been described where RSRP is used as the path-loss information, the invention is not limited thereto. A parameter indicating the reception quality of a reference signal, such as reference signal received quality (RSRQ), may be used.

Sixth Embodiment

In a sixth embodiment, a CSI request is transmitted from a transmission apparatus to each reception apparatus to be temporally distributed simultaneously with or earlier than the transmission timing of the reference signal CSI-RS for CSI measurement. Each reception apparatus determines the CSI report timing of the own apparatus on the basis of a CSI report offset using a value uniquely determined by a parameter depending on each reception apparatus. In this case, a CSI report offset is set in accordance with the difference between RSRP of a cell which transmits a CSI request and RSRP of a cell which transmits CSI-RS as a measurement target from among CSI-RS transmitted from a plurality of cells, and the CSI report timing of the own apparatus is set to the timing delayed by the CSI report offset after a predefined report interval elapses from the reception timing of CSI-RS. Thus, the timing at which the CSI request is transmitted and the timing at which the CSI report is transmitted respectively are distributed.

As an example of a system which transmits CSI-RS from a plurality of cells and performs a CSI report, there is a system which performs data transmission or interference control between a plurality of cells in a coordinated manner for a macro-diversity effect (a geographically separated transmission point is utilized, and a link having a separate path-loss is utilized) (called coordinated multiple-point transmission and reception: CoMP). A cell as a CSI report target at that time may be called a CoMP measurement set.

Figure 15:
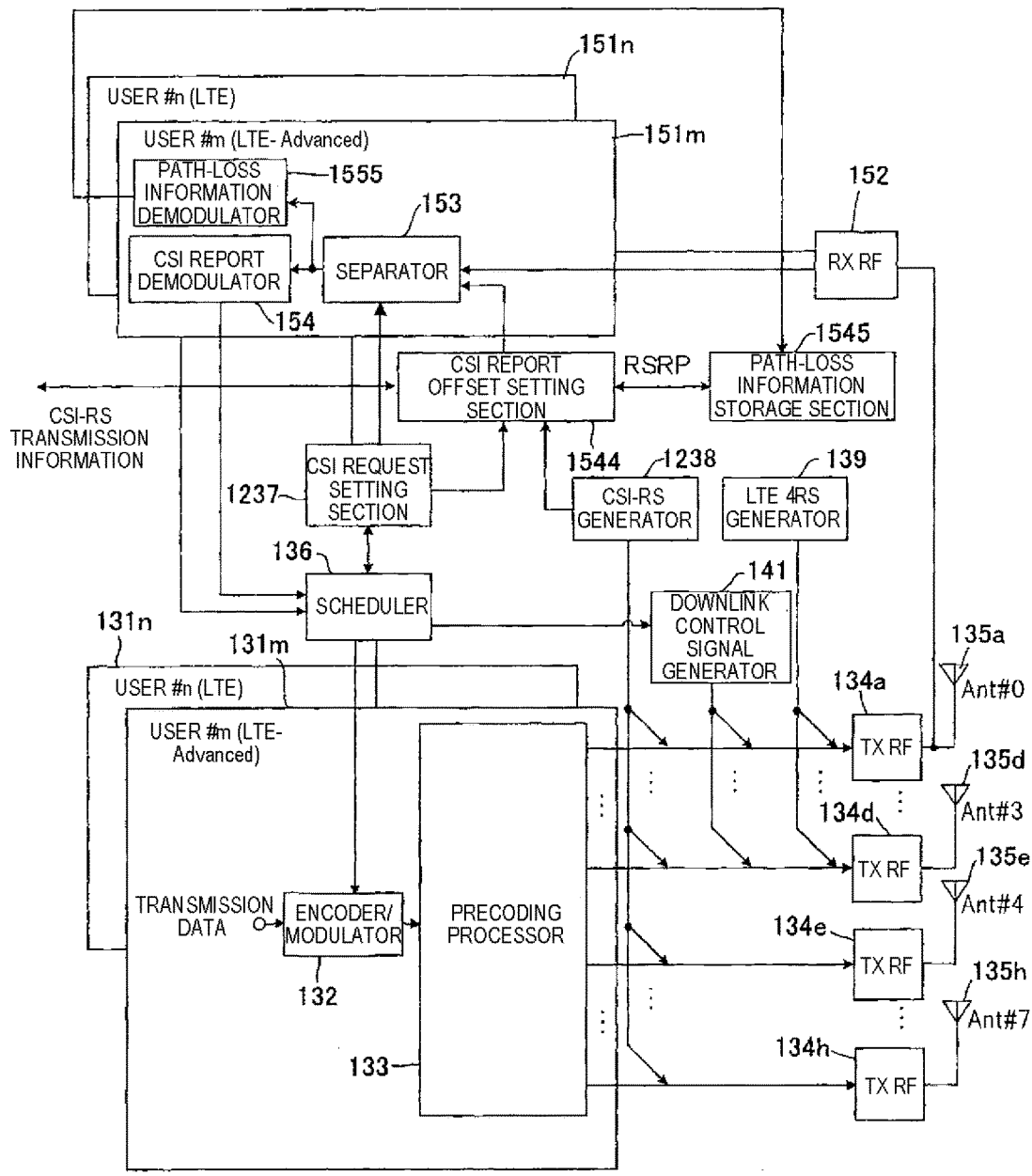
FIG. 15 is a block diagram showing the configuration of a main part of a transmission apparatus according to a sixth embodiment of the invention.
Figure 16:
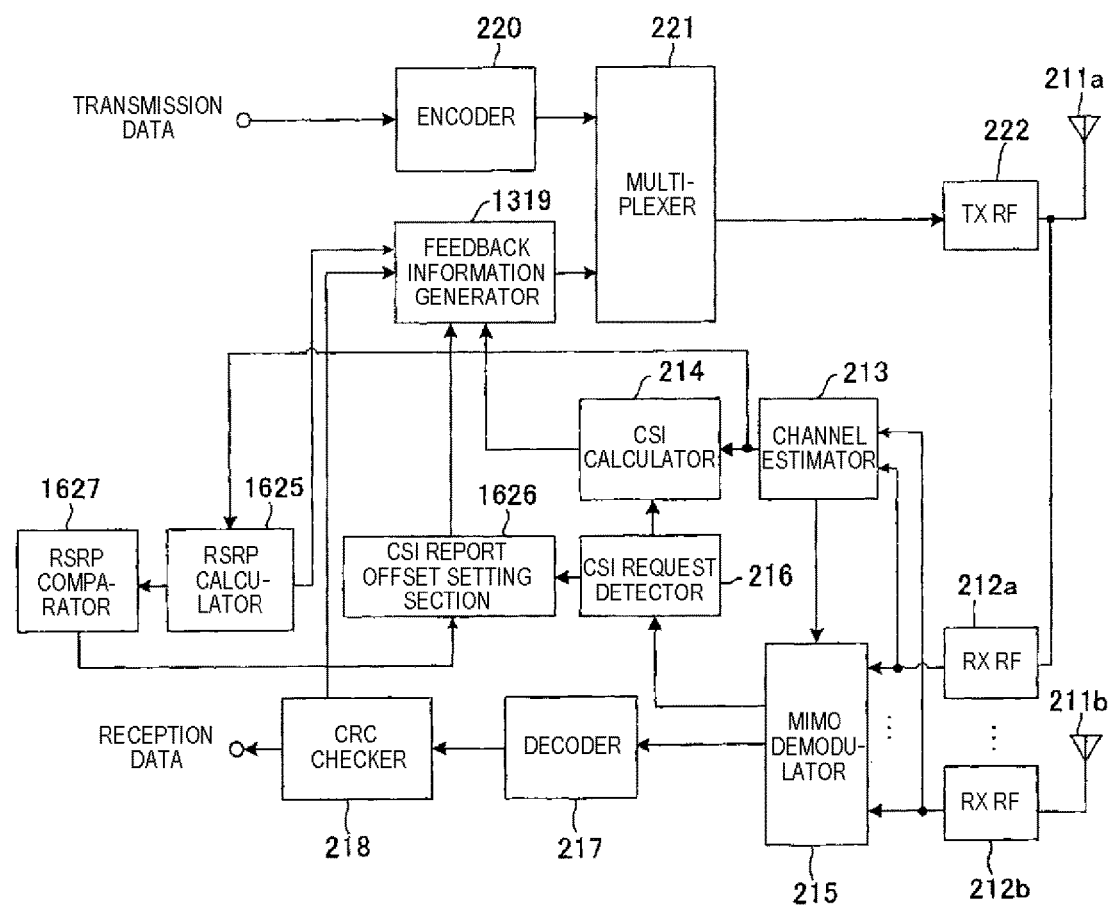
FIG. 16 is a block diagram showing the configuration of a main part of a reception apparatus according to the sixth embodiment of the invention.

FIG. 15 is a block diagram showing the configuration of a main part of a transmission apparatus according to a sixth embodiment of the invention. FIG. 16 is a block diagram showing the configuration of a main part of a reception apparatus according to the sixth embodiment of the invention. In the figures, the same constituent elements as those in the fifth embodiment are represented by the same reference numerals. Description will be mainly provided focusing on portions different from the fifth embodiment, and description of the same portions will be omitted.

In the transmission apparatus of the sixth embodiment, the operations of a path-loss information demodulator 1555, a CSI report offset setting section 1544, and a path-loss information storage section 1545 are different from the fifth embodiment. Here, an example will be described where two cells of a serving-cell (a cell in which a user equipment needs to receive PDCCH) and a target-cell (an arbitrary cell other than the serving-cell in the CoMP measurement set: a candidate cell in which a user equipment does not need to receive PDCCH, but data allocation or interference control is performed) respectively transmit CSI-RS, and path-loss information is used as a parameter depending on each reception apparatus. As in the fifth embodiment, an example will be described where RSRP is used as the path-loss information.

The path-loss information demodulator 1555 outputs a plurality of pieces of path-loss information received from the reception apparatuses to the path-loss information storage section 1545. The CSI report offset setting section 1544 receives the transmission timing of CSI-RS in advance in each cell in a state where each reception apparatus reports path-loss information. The CSI report offset setting section 1544 receives the path-loss information of a cell as a CSI report target and the own path-loss information from the path-loss information storage section 1545, and sets the CSI report offset for each reception apparatus on the basis of a value obtained by comparison (or by taking the difference). The CSI report offset setting section 1544 instructs a subframe, in which a CSI report is transmitted, based on the set CSI report offset and the CSI-RS transmission timing of the relevant cell to the separator 153 of the relevant UE.

The reception apparatus of the sixth embodiment includes an RSRP comparator 1627, and the operations of an RSRP calculator 1625 and a CSI report offset setting section 1626 are different from the fifth embodiment. The RSRP calculator 1625 measures reference signal received power using the channel estimation value received from the channel estimator 213, and outputs reference signal received power to the feedback information generator 1319 and the RSRP comparator 1627 as RSRP of each cell. The RSRP comparator 1627 compares RSRP of a cell which transmits a CSI request and RSRP of another call, and outputs the difference to the CSI report offset setting section 1626. The CSI report offset setting section 1626 uses a defined calculation table separately notified from the transmission apparatus through a notification channel or the like, and acquires a CSI report offset which is calculated from the difference in RSRP received from the RSRP comparator 1627. The CSI report offset setting section 1626 outputs the calculated CSI report offset to the feedback information generator 1319. In the example of UE1 in FIG. 17 described below, the CSI report offset is 2 subframes.

Figure 17:
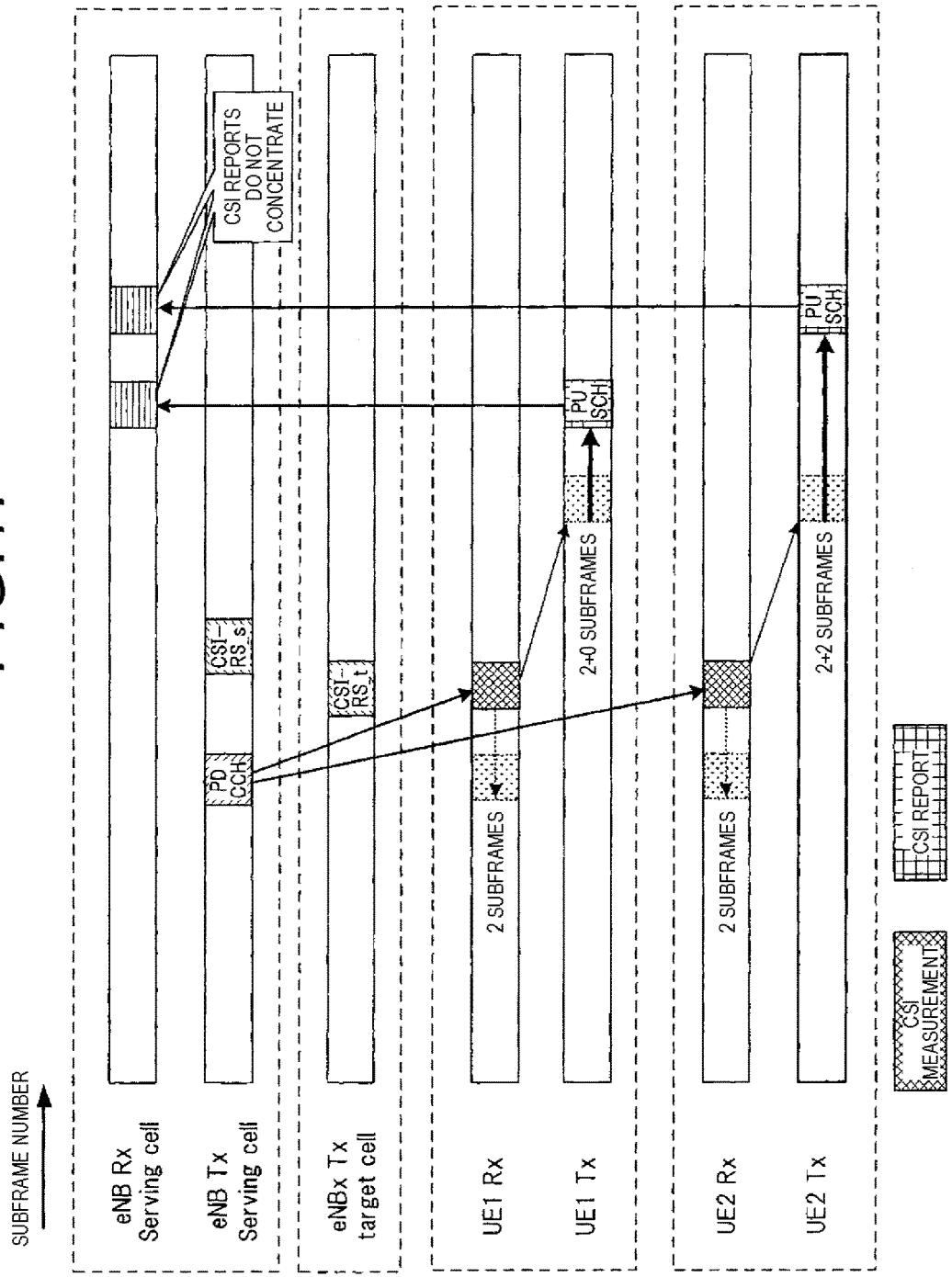
FIG. 17 is a diagram showing an operation relating to a CSI request and a CSI report in the sixth embodiment.

Next, the operations of the transmission apparatus and the reception apparatus in the sixth embodiment will be described in detail. FIG. 17 is a diagram showing an operation relating to a CSI request and a CSI report in the sixth embodiment. Here, a case will be described where CSI requests are transmitted from a base station (eNB) of a serving cell serving as a transmission apparatus and a base station (eNBx) of a target cell serving as another transmission apparatus to two user equipments (UE1 and UE2) serving as a reception apparatus, and a CSI report is returned from each user equipment to the base station.

Figures 18, 19:
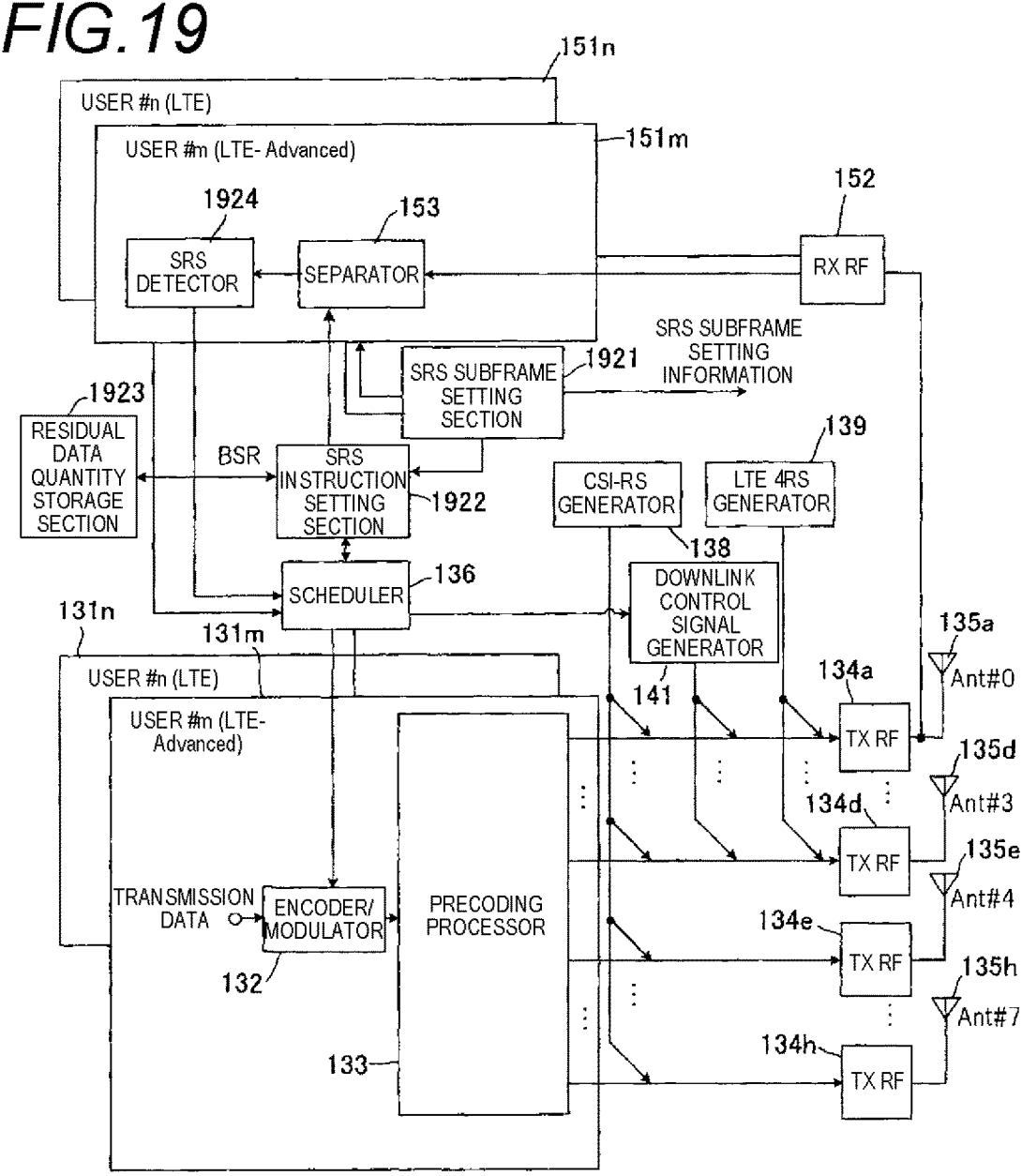
FIG. 18 is a table showing an example of a reference value of a CSI report offset corresponding to a difference in path-loss information between two cells in the sixth embodiment.
FIG. 19 is a block diagram showing the configuration of a main part of a transmission apparatus according to a seventh embodiment of the invention.

The transmission apparatus eNB notifies a reference value for obtaining the set value of the CSI report offset by the difference in path-loss information between the two cells measured by each reception apparatus to a plurality of reception apparatuses belonging to the own apparatus (FIG. 18). FIG. 18 is a table showing an example of a reference value of a CSI report offset corresponding to a difference in path-loss information between two cells in the sixth embodiment. FIG. 18 shows a reference value offset of an offset with respect to a difference diff in path-loss information. Here, RSRP is used as the path-loss information.

The transmission apparatus eNB outputs an instruction of a CSI request to the reception apparatuses UE1 and UE2 to be distributed over the reception apparatuses at the timing earlier than CSI-RS transmission of the target cell by the user equipment transmission signal processor 131m. At this time, the CSI request transmission timing to each reception apparatus may be set on the basis of the CSI report offset for each reception apparatus or may be arbitrarily set. A reception apparatus UE which meets the CSI request calculates the set value of the CSI report offset using the reference value notified previously, and specifies the CSI report subframe of the own apparatus on the basis of the CSI report offset. A specific example will be described below.

In a state where the transmission apparatus eNB sets the reference value as shown in FIG. 18, it is measured in UE1 that the RSRP difference between the serving cell and the target cell is −3 dB, it is measured in UE2 that the RSRP difference is 5 dB, and the measurement results are reported to the transmission apparatus eNB. At this time, in UE1, the reference value of the offset is 0 from FIG. 18. For this reason, in UE1, a CSI report is transmitted to the transmission apparatus eNB using a subframe after the number (for example, $n_{CSI-RS}$) of subframes of the predefined report interval from when CSI-RS is measured in the target cell immediately after receiving the instruction of the CSI request and 2 subframes. Meanwhile, in UE2, as shown in FIG. 18, an offset of 2 subframes is added. For this reason, in UE2, a CSI report is transmitted to the transmission apparatus eNB using a subframe after the number of subframes of the predefined report interval from when CSI-RS is measured immediately after receiving the instruction of the CSI request, as in UE1, and 4 subframes.

With the above-described operation, from the viewpoint of the transmission apparatus eNB, it is possible to distribute the downlink control channel PDCCH for a CSI request in the time domain, and also to distribute the uplink data channel PUSCH which is allocated as a CSI report. In a user equipment which has a small difference in RSRP between the serving cell and the target cell at present, and the resource of the target cell is easily allocated, the CSI report of the target cell can be performed early. In a user equipment which has a large difference in RSRP between the serving cell and the target cell at present, and the resource of the target cell is not easily allocated, the CSI report timing can be controlled assuming that report delay is allowable. That is, in this embodiment, it is possible to distribute the timing at which the CSI report is transmitted over a plurality of cells and user equipments which perform coordinated multiple-point transmission and reception. As described above, according to the sixth embodiment, it is possible to distribute the CSI requests and CSI reports in the time domain without causing degradation in throughput.

Seventh Embodiment

In a seventh embodiment, an SRS instruction is transmitted from a transmission apparatus to each reception apparatus at the timing before an SRS transmission subframe by $n_{srs}$ or at the earlier timing. Here, $n_{srs}$ is the minimum required number of subframes necessary from the SRS instruction to SRS transmission for the reason from the viewpoint of generating an SRS signal due to the amount of processing in the user equipment, similarly to $n_{CSI-RS}$. The SRS instruction is a request which causes SRS for measuring channel quality information to be transmitted from a reception apparatus serving as a communication party. The set value of the SRS transmission subframe is a given subframe interval, is set by, for example, the number of reception apparatuses which perform communication, or the like, and is notified from the transmission apparatus to the reception apparatus using notification information or the like.

FIG. 19 is a block diagram showing the configuration of a main part of a transmission apparatus according to a seventh embodiment of the invention. In the figure, the same constituent elements as those in the first embodiment are represented by the same reference numerals. Description will be mainly provided focusing on portions different from the first embodiment, and description of the same portions will be omitted.

The transmission apparatus of the seventh embodiment is different from the configuration in the first embodiment in that an SRS subframe setting section 1921, an SRS instruction setting section 1922, a residual data quantity storage section 1923, and an SRS detector 1924 are provided.

The SRS subframe setting section 1921 sets an integer value, which is a value common to a plurality of reception apparatuses belonging to the own apparatus, as an SRS transmission interval, notifies the set value of the SRS subframe interval to the SRS instruction setting section 1922 regularly, and notifies the set value of the SRS subframe interval to each reception apparatus through a notification channel or the like. The SRS instruction setting section 1922 acquires the residual data quantity of each reception apparatus from the residual data quantity storage section 1923, and sets the SRS transmission timing in accordance with the residual data quantity. Here, an example will be described where a buffer status report (BSR) which is data buffer information reported by reception apparatus to determine the need for allocating an uplink resource in the transmission apparatus is used as the residual data quantity. With regard to the residual data quantity, another piece of transmission data, information relating to a buffer, or the like may be used.

The SRS subframe setting section 1921 notifies user equipment-specific LTE SRS setting information to an LTE user equipment and an LTE-A user equipment.

The SRS instruction setting section 1922 sets a threshold value for comparison with BSR information for obtaining an offset to be provided to the SRS transmission timing in advance. The threshold value is notified to each reception apparatus through a notification channel or the like. The SRS instruction setting section 1922 sets the SRS instruction timing to each reception apparatus, and sends a notification to the scheduler 136 to generate a control signal of an SRS instruction for UE in the subframe of the set SRS instruction timing.

The residual data quantity storage section 1923 receives and stores the BSR information (not shown) received from the user equipment. The SRS instruction setting section 1922 receives BSR reported by the reception apparatus from the residual data quantity storage section 1923, and sets the SRS transmission timing for each reception apparatus on the basis of the magnitude relationship with the defined threshold value. The SRS instruction setting section 1922 instructs a subframe, in which SRS is transmitted, based on the set SRS transmission timing and the SRS subframe received from the SRS subframe setting section 1921 to the separator 153 of the relevant UE.

Figures 20, 21:
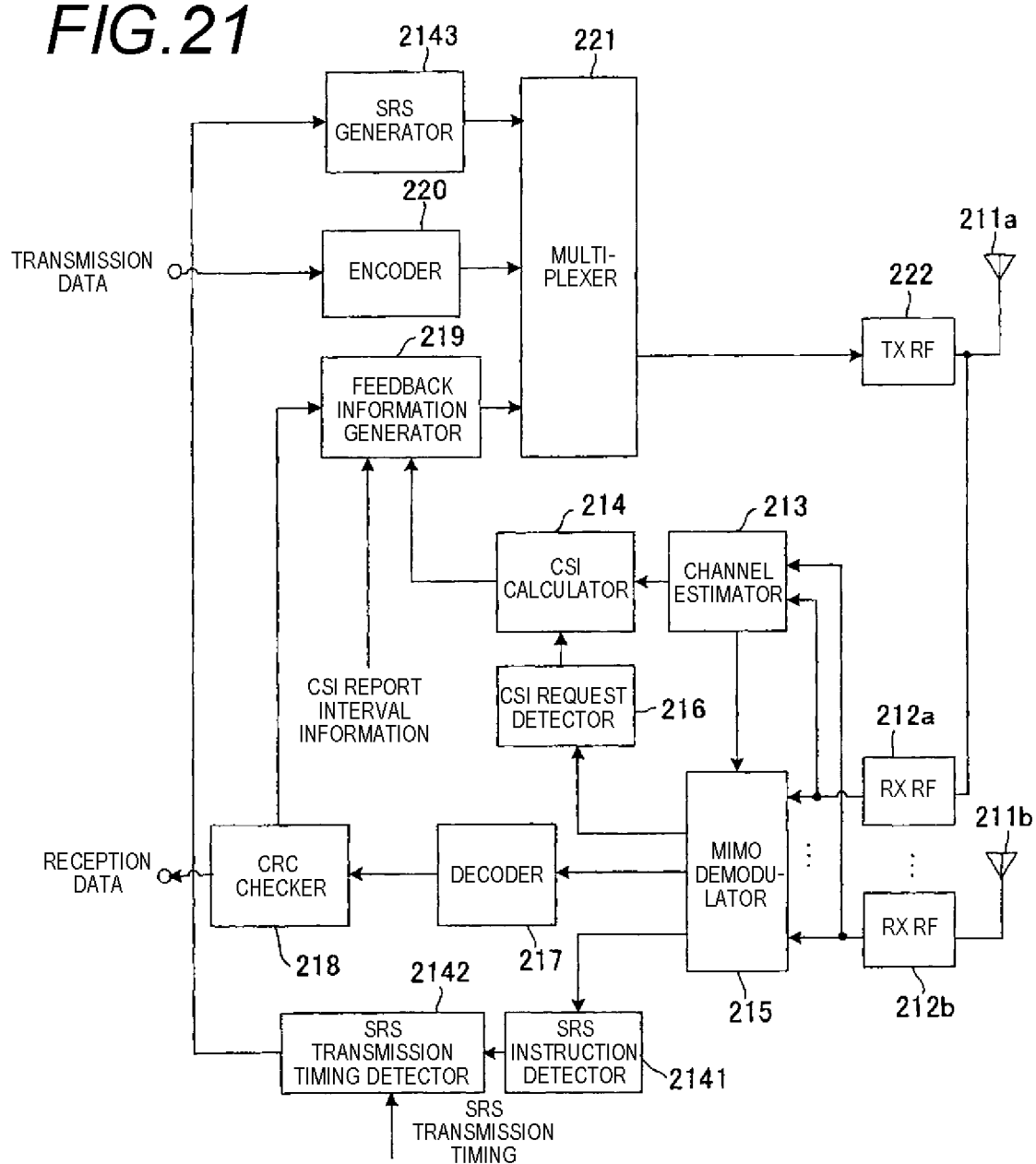
FIG. 20 is a table showing an example of a reference value of an SRS transmission timing corresponding to a residual data quantity in the seventh embodiment.
FIG. 21 is a block diagram showing the configuration of a main part of a reception apparatus according to the seventh embodiment of the invention.

The transmission apparatus notifies the reference value for obtaining the set value of the SRS transmission timing by the reported residual data quantity of each reception apparatus to a plurality of reception apparatuses belonging to the own apparatus (FIG. 20). FIG. 20 shows an example of a reference value of an SRS transmission timing corresponding to a residual data quantity in the seventh embodiment. FIG. 20 shows a reference value delay of the transmission timing delay amount with respect to a residual data quantity BSR index.

The SRS detector 1924 detects SRS of UE received from the separator 153 to measure the channel quality of a propagation channel from the reception apparatus to the transmission apparatus, and outputs the channel quality to the scheduler 136. The scheduler 136 performs at least one of frequency scheduling and adaptive MCS control on the basis of the channel quality received from the SRS detector 1924 as scheduling relating to a transmission signal.

The separator 153 separates a data part from a signal transmitted from the reception apparatus in accordance with scheduling, and outputs the data part to the demodulator/decoder (not shown).

FIG. 21 is a block diagram showing the configuration of a main part of a reception apparatus according to the seventh embodiment of the invention. In the figure, the same constituent elements as those in the first embodiment are represented by the same reference numerals. Description will be mainly provided focusing on portions different from the first embodiment, and description of the same portions will be omitted.

The reception apparatus of the seventh embodiment is different from the first embodiment in that an SRS instruction detector 2141, an SRS transmission timing detector 2142, and an SRS generator 2143 are provided. The SRS instruction detector 2141 receives a demodulated signal output from the MIMO demodulator 215 as input, detects an SRS instruction signal, and notifies the result to the SRS transmission timing detector 2142. When the indication that the SRS instruction signal is detected by the SRS instruction detector 2141 is indicated, the SRS transmission timing detector 2142 acquires the SRS transmission timing from the separately reported residual data quantity. The SRS transmission timing detector 2142 outputs the SRS transmission timing to the SRS generator 2143. In the example of UE2 in FIG. 22 described below, the SRS transmission timing is $T_{sfc}$ subframes. The SRS generator 2143 generates an SRS signal using a transmitted power set value which is notified from the SRS transmission timing detector 2142 or on a control signal indicating the SRS instruction signal.

Figure 22:
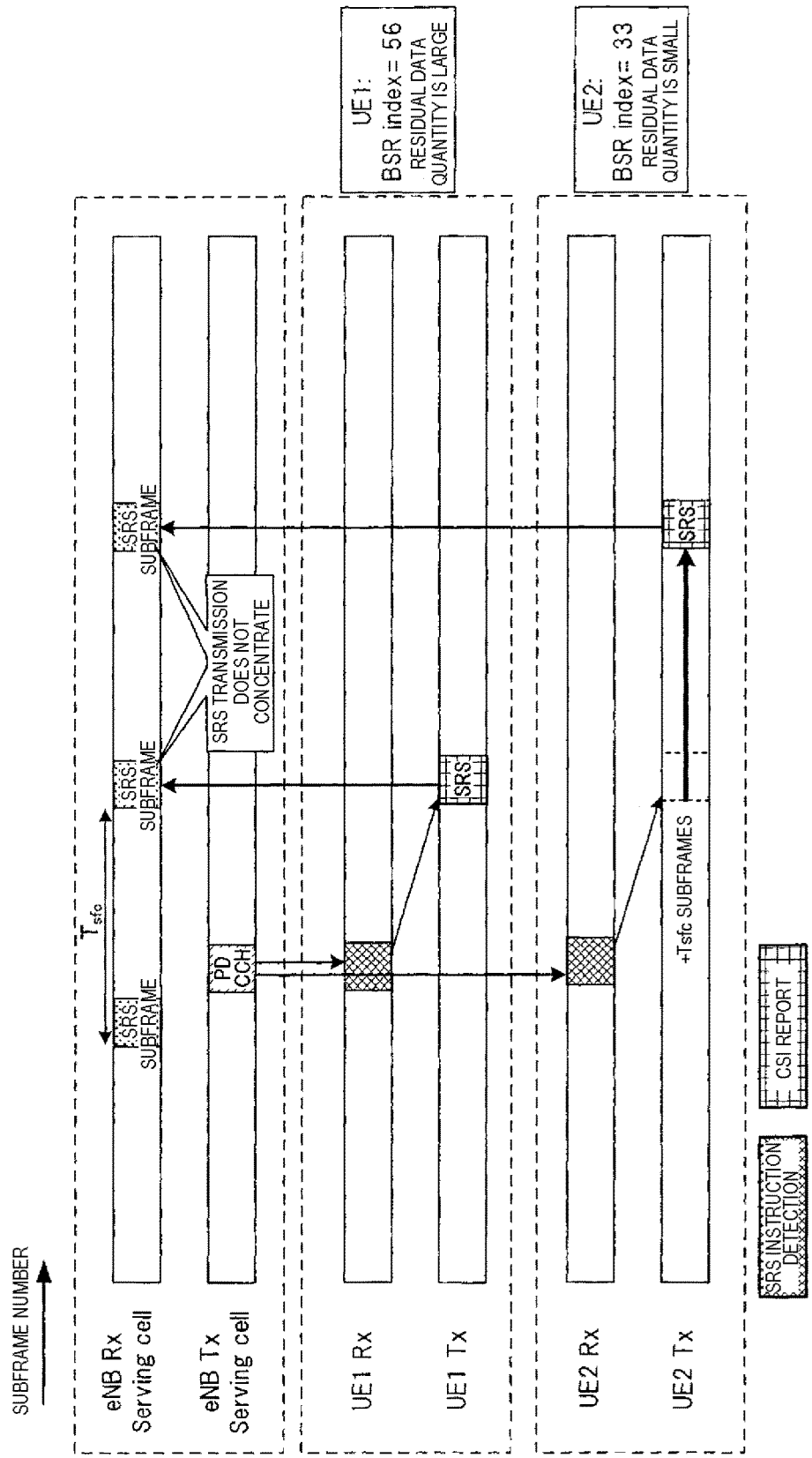
FIG. 22 is a diagram showing an operation relating to SRS instruction and SRS transmission in the seventh embodiment.

Next, the operations of the transmission apparatus and the reception apparatus in the seventh embodiment will be described supplementally. FIG. 22 is a diagram showing an operation relating to SRS instruction and SRS transmission in the seventh embodiment. Here, as in the first embodiment, a case will be described where an SRS instruction is transmitted from a base station (eNB) serving as a transmission apparatus to two user equipments (UE1 and UE2) serving as a reception apparatus, and SRS is transmitted from each user equipment to the base station.

The transmission apparatus eNB outputs an SRS instruction to the reception apparatuses UE1 and UE2 by the user equipment transmission signal processor 131m. A reception apparatus UE which meets the SRS instruction determines the SRS transmission timing from the subframe in which PDCCH including the SRS instruction is detected and the reference value of the SRS transmission timing corresponding to the residual data quantity notified previously, and specifies a subframe in which the own apparatus transmits SRS.

In the example of FIG. 22, the transmission apparatus eNB transmits an SRS instruction to the reception apparatus UE1 in PDCCH before the SRS subframe by $n_{srs}$ subframes, and the reception apparatus UE1 receives the SRS instruction. If the SRS instruction is detected, the reception apparatus UE1 transmits SRS to the transmission apparatus eNB using a subframe after the number (for example, $n_{srs}$) of subframes of a predefined report interval from the relevant subframe. Similarly, the transmission apparatus eNB transmits an SRS instruction to the reception apparatus UE2 in PDCCH before the SRS subframe by the $n_{srs}$ subframes, and the reception apparatus UE2 receives the SRS instruction. The reception apparatus UE2 transmits SRS to the transmission apparatus eNB using a subframe after the number of subframes of the predefined report interval from the transmission timing of the SRS instruction and $T_{sfc}$ subframes. With the above-described operation, from the viewpoint of the transmission apparatus eNB, it is possible to distribute the resource of the uplink data channel PUSCH which is allocated as SRS transmission.

As described above, in the seventh embodiment, SRS is transmitted from each reception apparatus to the transmission apparatus at the timing delayed by the delay amount based on the residual data quantity after the predefined report interval from the transmission timing of the SRS instruction. Thus, it is possible to suppress concentration of SRS transmission at specific resources in the time domain and to prevent degradation in throughput. In particular, at the time of scheduling of uplink data, UE having a large residual data quantity can transmit SRS at the early timing, thereby reducing resource allocation for data transmission and MCS control errors in UE having a large residual data quantity.

Although an example has been described where the SRS instruction is transmitted at the timing before the SRS transmission subframe by $n_{srs}$, the invention is not limited thereto. As in the first embodiment, the timing at which an SRS instruction is transmitted may be distributed at the timing before the SRS transmission subframe by $n_{srs}$ or at the earlier timing, and SRS may be transmitted at the timing delayed by the delay amount based on the residual data quantity after the predefined report interval. Thus, the timing at which the SRS instruction is transmitted and SRS transmission can be respectively distributed, thereby suppressing concentration of SRS instructions and SRS transmission at specific resources in the time domain and preventing degradation in throughput. When the received quality is satisfactory and signal energy necessary for an SRS instruction is small in UE belonging to the relevant base station, or the like, it is not necessary to distribute the timing at which an SRS instruction is transmitted, and only distribution of SRS transmission may be performed.

Eighth Embodiment

Figure 23:
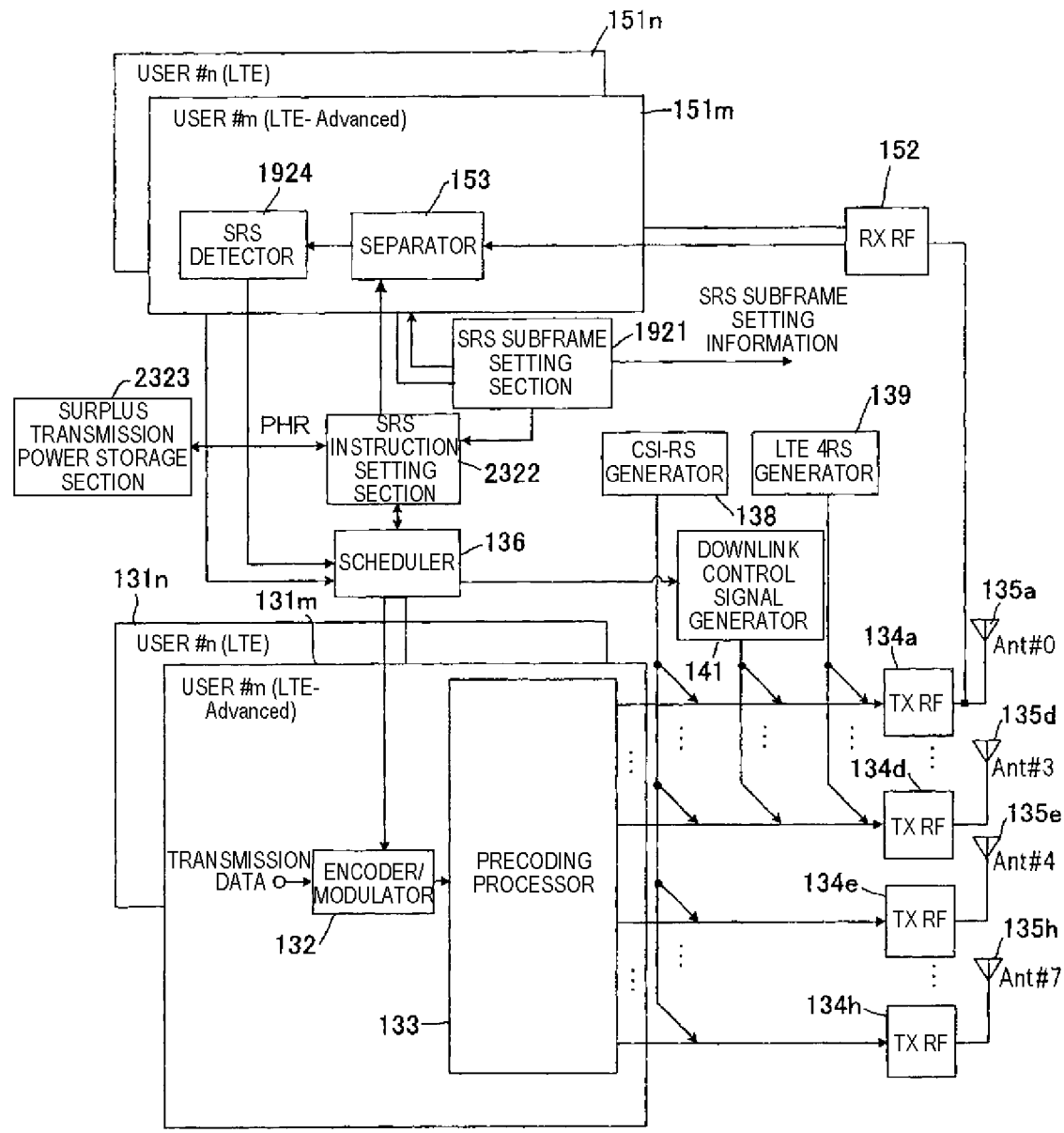
FIG. 23 is a block diagram showing the configuration of a main part of a transmission apparatus according to an eighth embodiment of the invention.
Figures 24, 25:
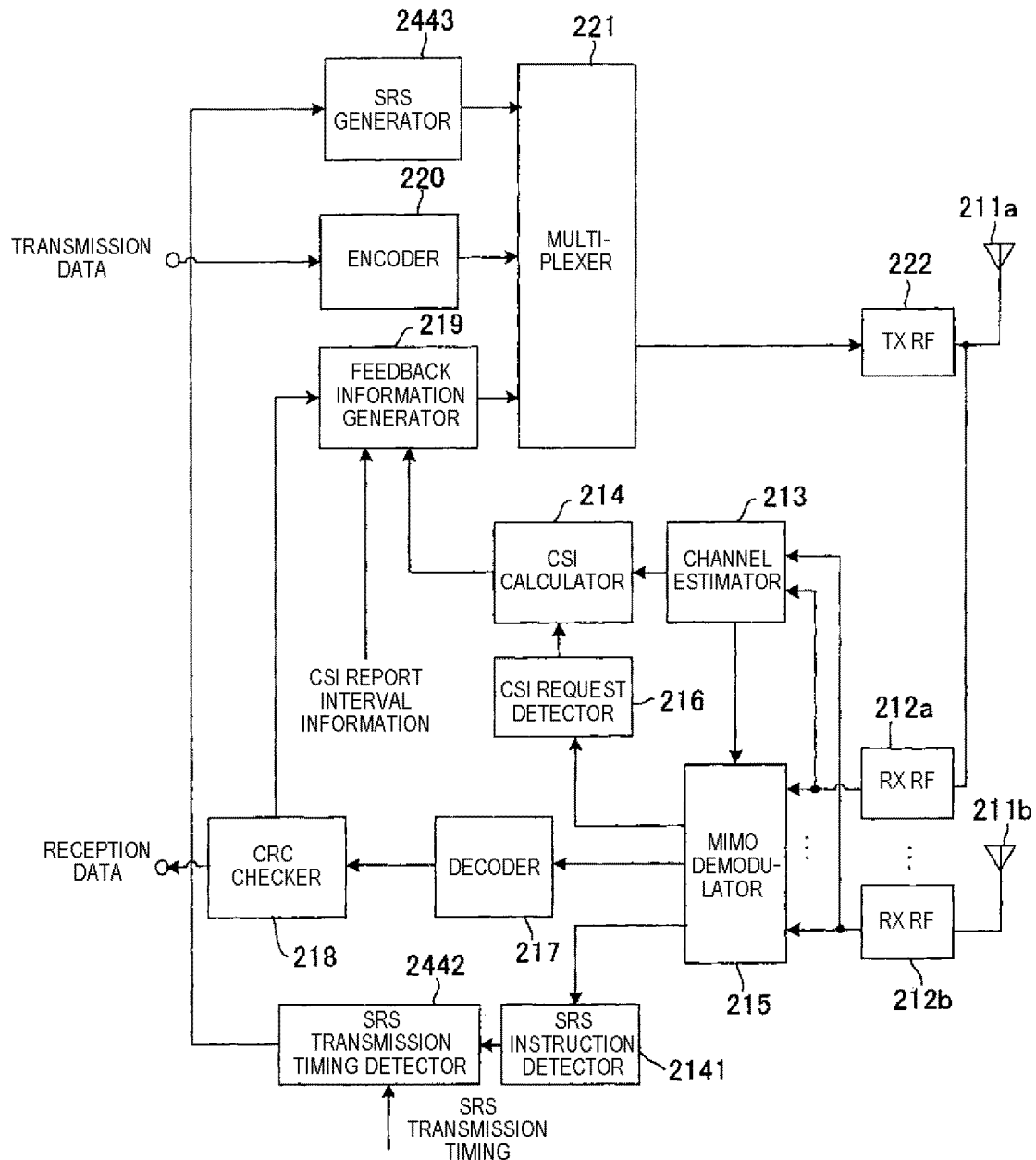
FIG. 24 is a block diagram showing the configuration of a main part of a reception apparatus according to the eighth embodiment of the invention.
FIG. 25 is a table showing an example of a reference value of an SRS transmission timing corresponding to surplus transmission power in the eighth embodiment.

In an eighth embodiment, the SRS signal transmission timing in the seventh embodiment is set in accordance with surplus transmission power. FIG. 23 is a block diagram showing the configuration of a main part of a transmission apparatus according to an eighth embodiment of the invention. FIG. 24 is a block diagram showing the configuration of a main part of a reception apparatus according to the eighth embodiment of the invention. In the figures, the same constituent elements as those in the seventh embodiment are represented by the same reference numerals. Description will be mainly provided focusing on portions different from the seventh embodiment, and description of the same portions will be omitted.

The transmission apparatus of the eighth embodiment includes a surplus transmission power storage section 2323, and the operation of an SRS instruction setting section 2322 is different from the configuration in the seventh embodiment. The SRS instruction setting section 2322 acquires the surplus transmission power of each reception apparatus from the surplus transmission power storage section 2323, and sets the SRS transmission timing in accordance with the surplus transmission power. An example will be described where a power head room (PHR) which is transmission power information reported to a transmission apparatus by a reception apparatus is used as the surplus transmission power. With regard to the surplus transmission power, information relating to another power control, or the like may be used.

The SRS instruction setting section 2322 sets SRS transmission power in accordance with the set SRS transmission timing, and instructs the SRS transmission power to the scheduler 136.

The transmission apparatus notifies a reference value obtaining the set value of the SRS transmission timing by the surplus transmission power reported by each reception apparatus to a plurality of reception apparatuses belonging to the own apparatus (FIG. 25). FIG. 25 shows an example of a reference value of an SRS transmission timing corresponding to surplus transmission power in the eighth embodiment. FIG. 25 shows a reference value delay of a transmission timing delay amount with respect to surplus transmission power PH.

In the reception apparatus of the eighth embodiment, the operations of an SRS transmission timing detector 2442 and an SRS generator 2443 are different from the configuration in the seventh embodiment. When the indication that the SRS instruction signal is detected by the SRS instruction detector 2141 is indicated, the SRS transmission timing detector 2442 acquires the SRS transmission timing from the separately notified surplus transmission power. The SRS transmission timing detector 2442 outputs the SRS transmission timing to the SRS generator 2443. In the example of UE2 in FIG. 26 described below, the SRS transmission timing is $T_{sfc}$ subframes. The SRS generator 2443 generates an SRS signal using a transmission power set value notified from the SRS transmission timing detector 2442 or on a control signal indicating the SRS instruction signal.

Figure 26:
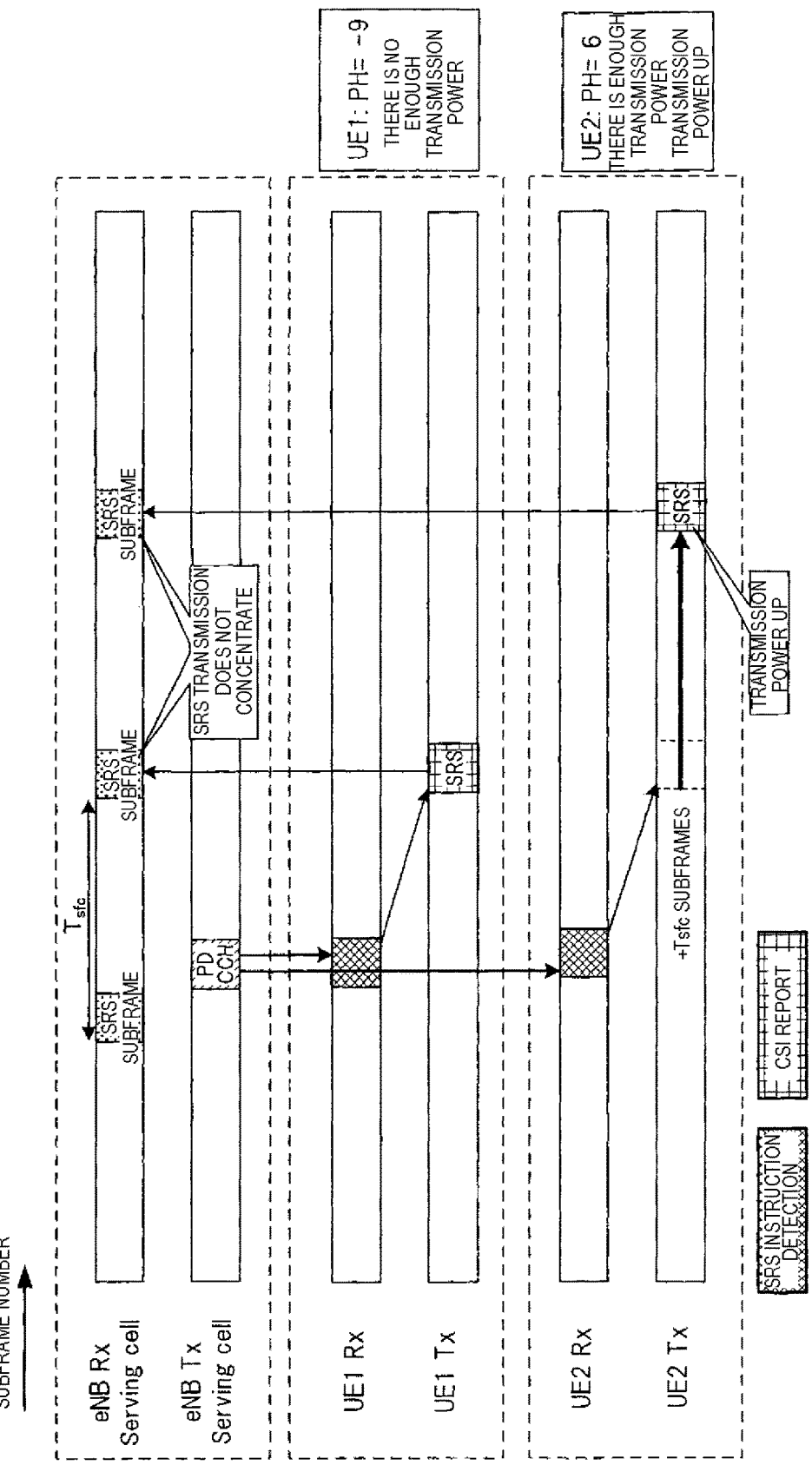
FIG. 26 is a diagram showing an operation relating to SRS instruction and SRS transmission in the eighth embodiment.

Next, the operations of the transmission apparatus and the reception apparatus in the eighth embodiment will be described supplementally. FIG. 26 is a diagram showing an operation relating to SRS instruction and SRS transmission in the eighth embodiment. Description will be mainly provided focusing on portions different from the seventh embodiment, and description of the same portions will be omitted. A reception apparatus UE which meets the SRS instruction determines the SRS transmission timing from the subframe in which PDCCH including the SRS instruction is detected and the reference value of the SRS transmission timing corresponding to the surplus transmission power notified previously, and specifies a subframe in which the own apparatus transmits SRS.

In the example of FIG. 26, the reception apparatus UE2 transmits SRS to the transmission apparatus eNB using a subframe after the number of subframes of the predefined report interval from the transmission timing of the SRS instruction and $T_{sfc}$ subframes. With the above-described operation, from the viewpoint of the transmission apparatus eNB, it is possible to distribute the resource of the uplink data channel PUSCH which is allocated as SRS transmission.

As described above, in the eighth embodiment, SRS is transmitted from each reception apparatus to the transmission apparatus at the timing delayed by the delay amount based on the surplus transmission power after the predetermined report interval from the transmission timing of the SRS instruction. Thus, it is possible to suppress concentration of SRS transmission at specific resources in the time domain and to prevent degradation in throughput. In particular, at the time of scheduling of uplink data, UE having small surplus transmission power can transmit SRS at the early timing, thereby reducing uplink data allocation delay and MCS control errors in UE having small surplus transmission power. A configuration is made such that UE having large surplus transmission power perform transmission with large power by the delay amount, thereby reducing MCS control errors.

In the eighth embodiment, as in the first embodiment, the timing at which an SRS instruction is transmitted may be distributed at the timing before the SRS transmission subframe by $n_{srs}$ or at the earlier timing, and SRS may be transmitted at the timing delayed by the delay amount based on the surplus transmission power after the predefined report interval. Thus, the timing at which an SRS instruction is transmitted and SRS transmission can be respectively distributed, thereby suppressing concentration of SRS instructions and SRS transmission at specific resources in the time domain and preventing degradation in throughput. As in the seventh embodiment, when the received quality is satisfactory and signal energy necessary for an SRS instruction is small in UE belonging to the relevant base station, or the like, it is not necessary to distribute the timing at which an SRS instruction is transmitted, and only distribution of SRS transmission may be performed.

Ninth Embodiment

Figure 27:
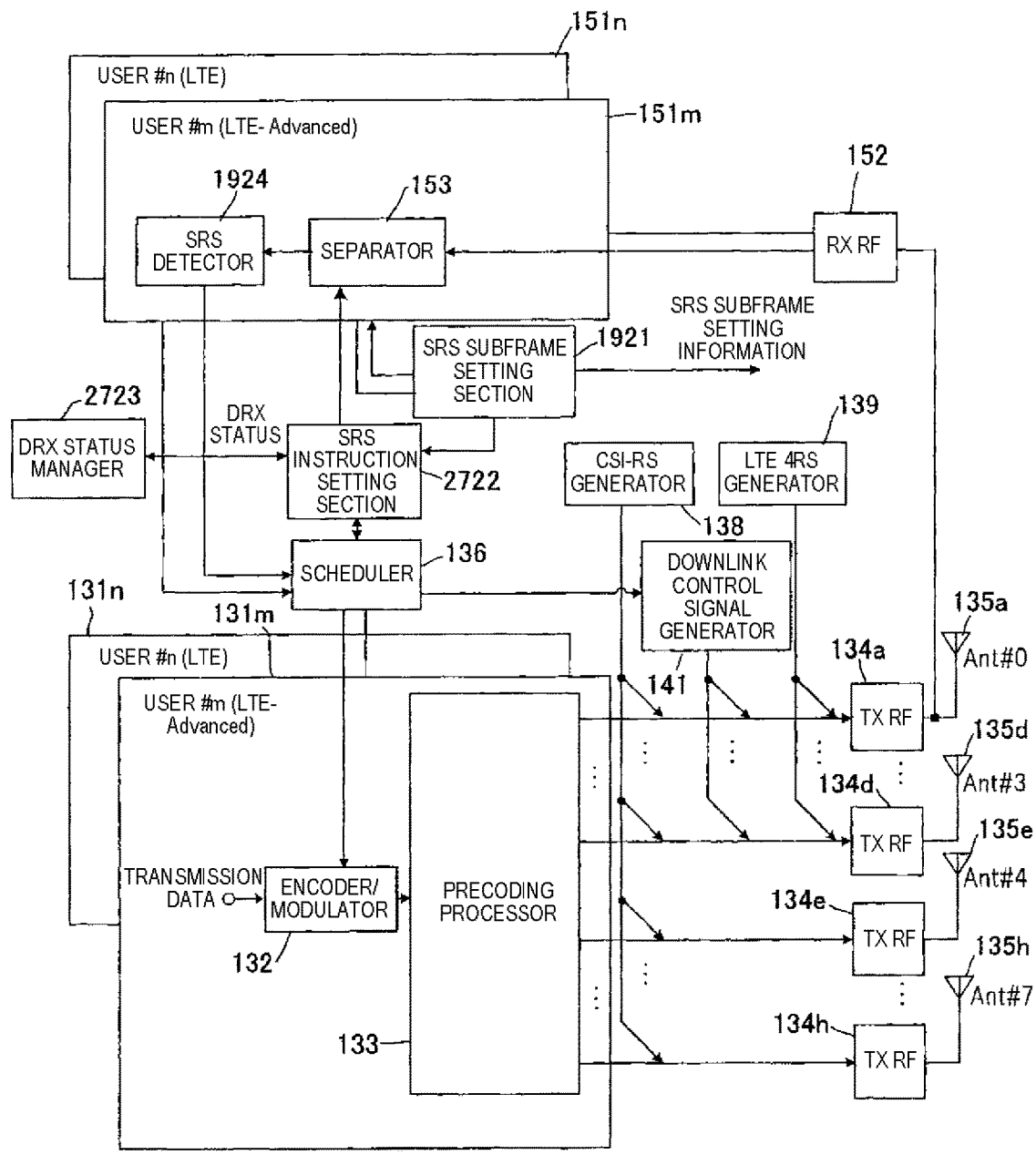
FIG. 27 is a block diagram showing the configuration of a main part of a transmission apparatus according to a ninth embodiment of the invention.
Figure 28:
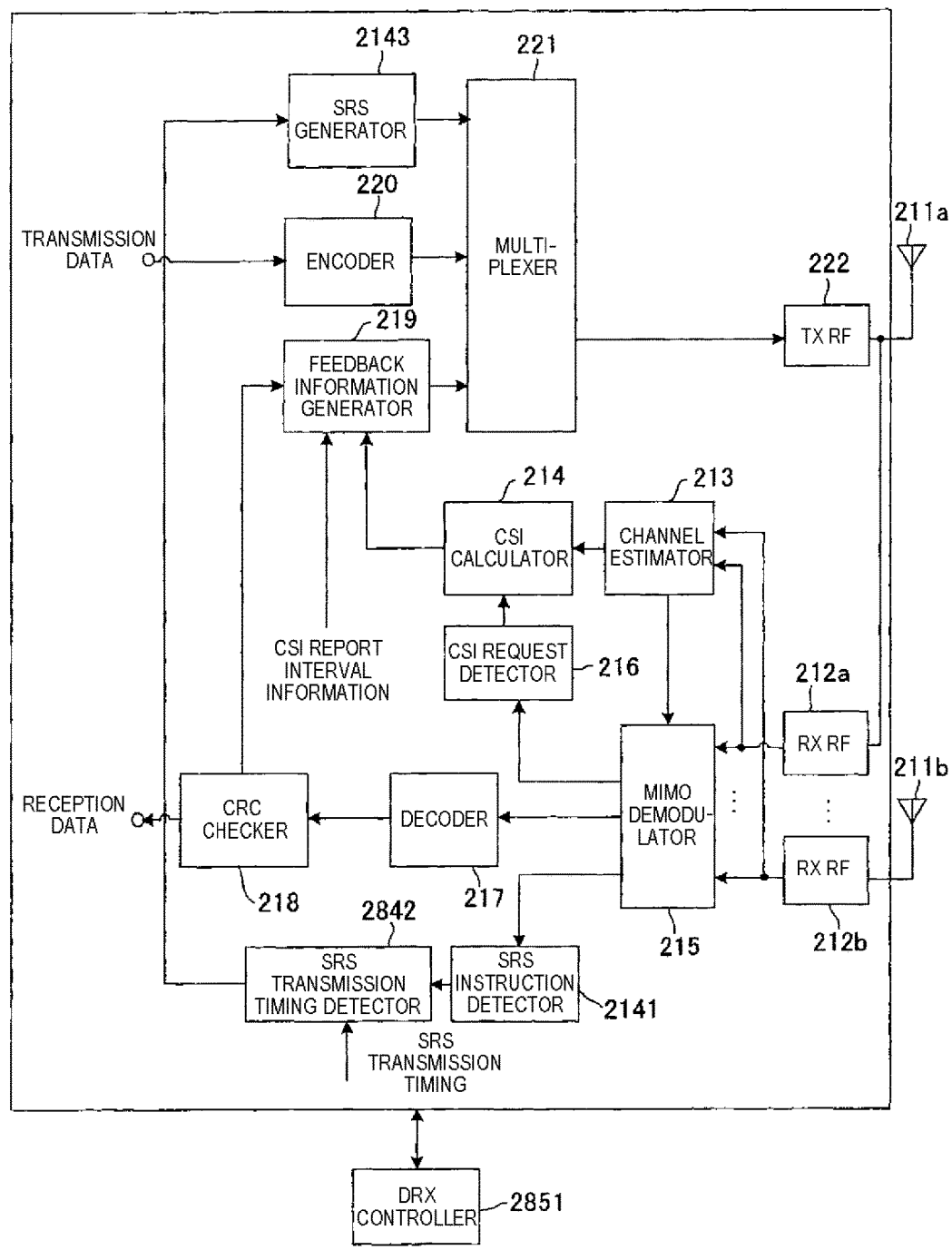
FIG. 28 is a block diagram showing the configuration of a main part of a reception apparatus according to the ninth embodiment of the invention.

In a ninth embodiment, the SRS signal transmission timing in the seventh embodiment is set in accordance with the status of a discontinuous reception (DRX) operation. FIG. 27 is a block diagram showing the configuration of a main part of a transmission apparatus according to a ninth embodiment of the invention. FIG. 28 is a block diagram showing the configuration of a main part of a reception apparatus according to the ninth embodiment of the invention. In the figures, the same constituent elements as those in the seventh embodiment are represented by the same reference numerals. Description will be mainly provided focusing on portions different from the seventh embodiment, and description of the same portions will be omitted.

The transmission apparatus of the ninth embodiment includes a DRX status manager 2723, and the operation of an SRS instruction setting section 2722 is different from the configuration of the seventh embodiment. The SRS instruction setting section 2722 detects the DRX status which is predicted in each reception apparatus by the DRX status manager 2723. Specifically, when data allocation is not performed for a given period in the past to the reception apparatus, a state where there is a high possibility for the transition to the DRX status is detected. The SRS instruction setting section 2722 instructs the separator 153 to separate SRS of the reception apparatus in an SRS subframe immediately after subframes corresponding to a DRX cycle indicating the cycle of DRX elapses from the set SRS transmission timing.

The reception apparatus of the ninth embodiment includes a DRX controller 2851, and the operation of an SRS transmission timing detector 2842 is different from the configuration of the seventh embodiment. When the indication that the SRS instruction signal is detected within the $n_{srs}$ subframes before a subframe in which the transition to the DRX status is done is indicated on the basis of a control signal from the DRX controller 2851, the SRS transmission timing detector 2842 acquires an SRS subframe immediately after a DRX cycle elapses as the SRS transmission timing.

Figure 29:
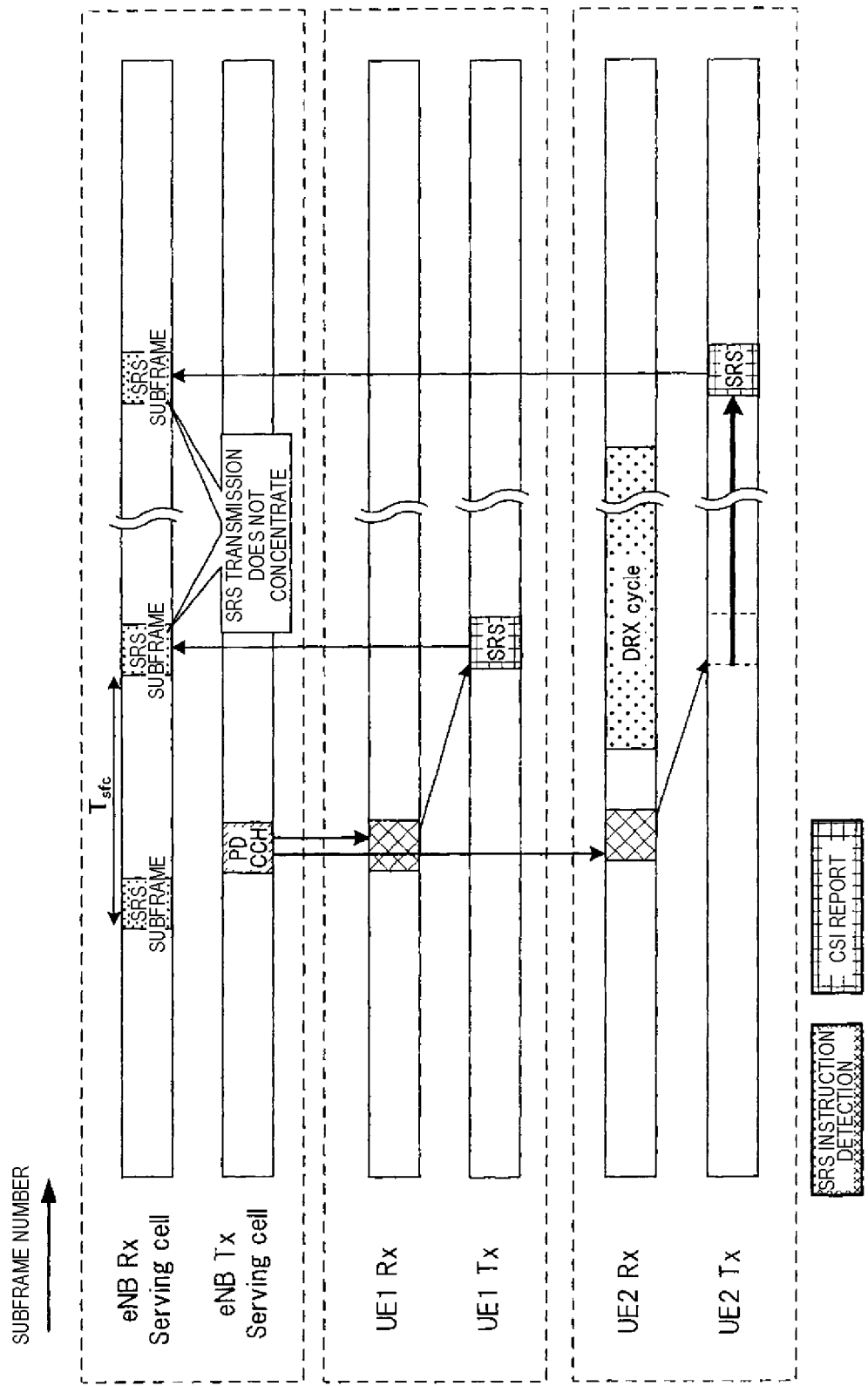
FIG. 29 is a diagram showing an operation relating to SRS instruction and SRS transmission in the ninth embodiment.
Figure 30:
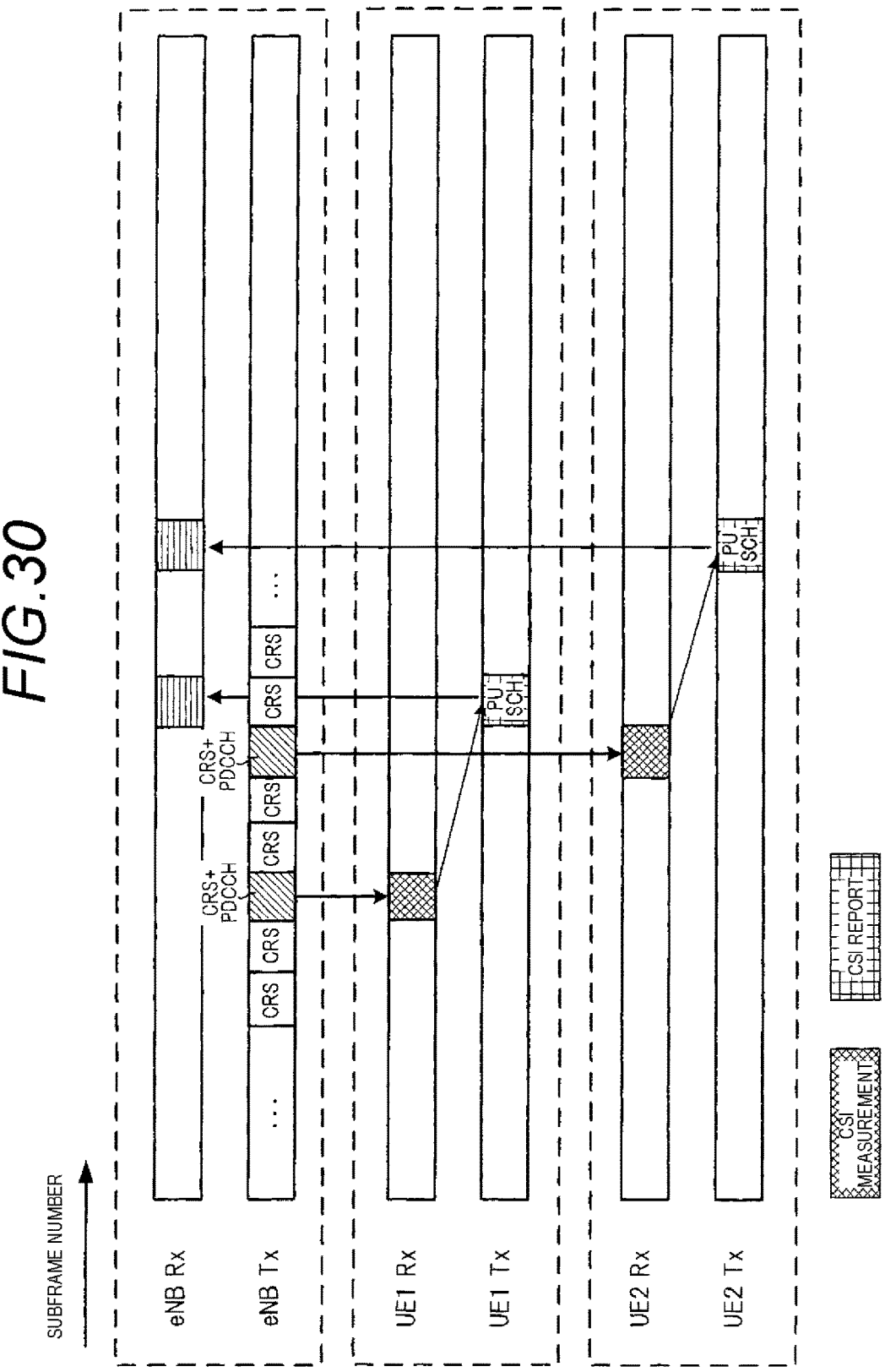
FIG. 30 is an operation explanatory diagram showing a procedure of a channel quality information request and a report with respect to the channel quality information request in LTE.
Figure 31:
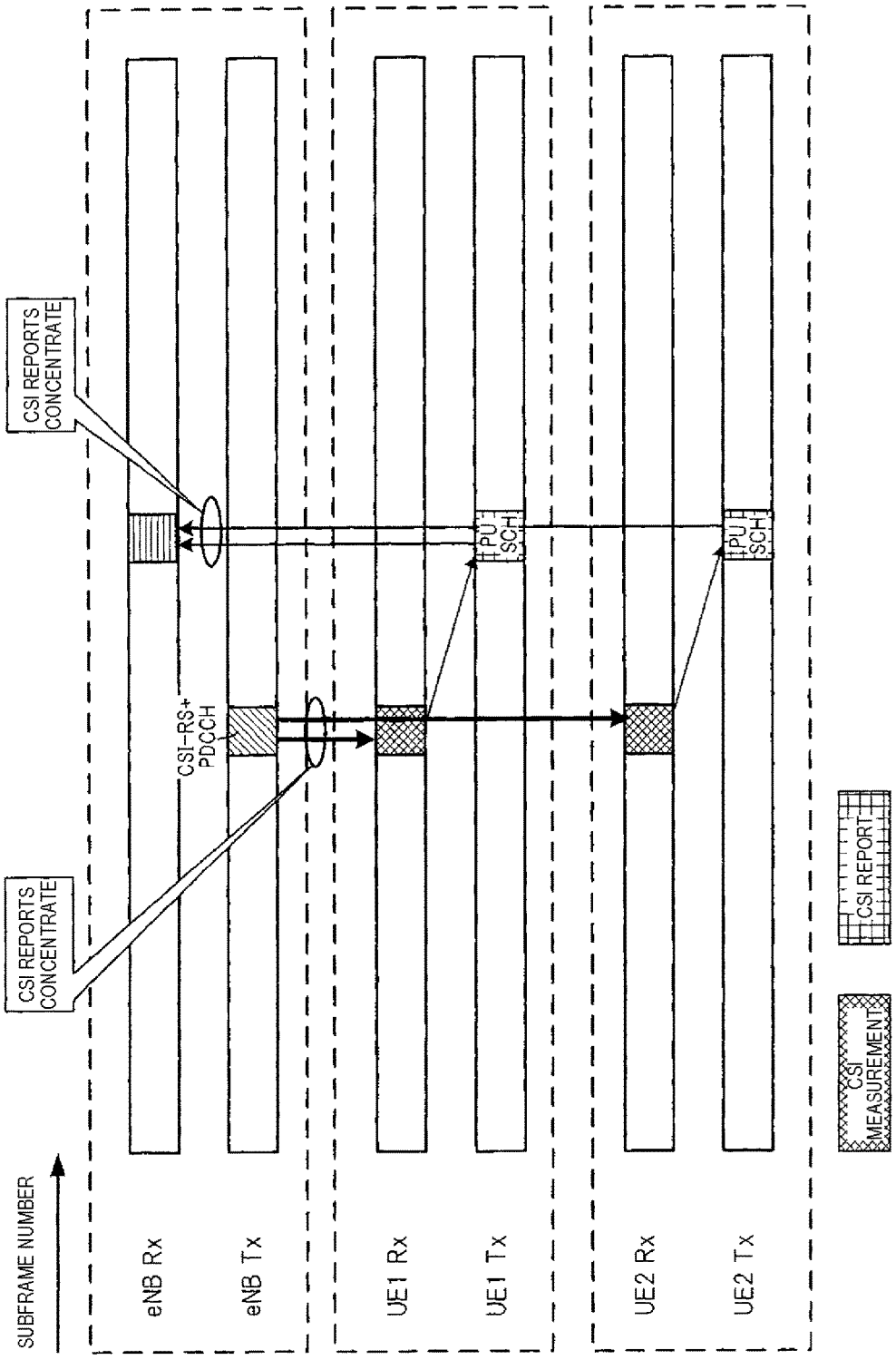
FIG. 31 is an operation explanatory diagram illustrating a problem in a CSI-RS transmission method which discontinuously transmits a CSI-RS.
Figure 32:
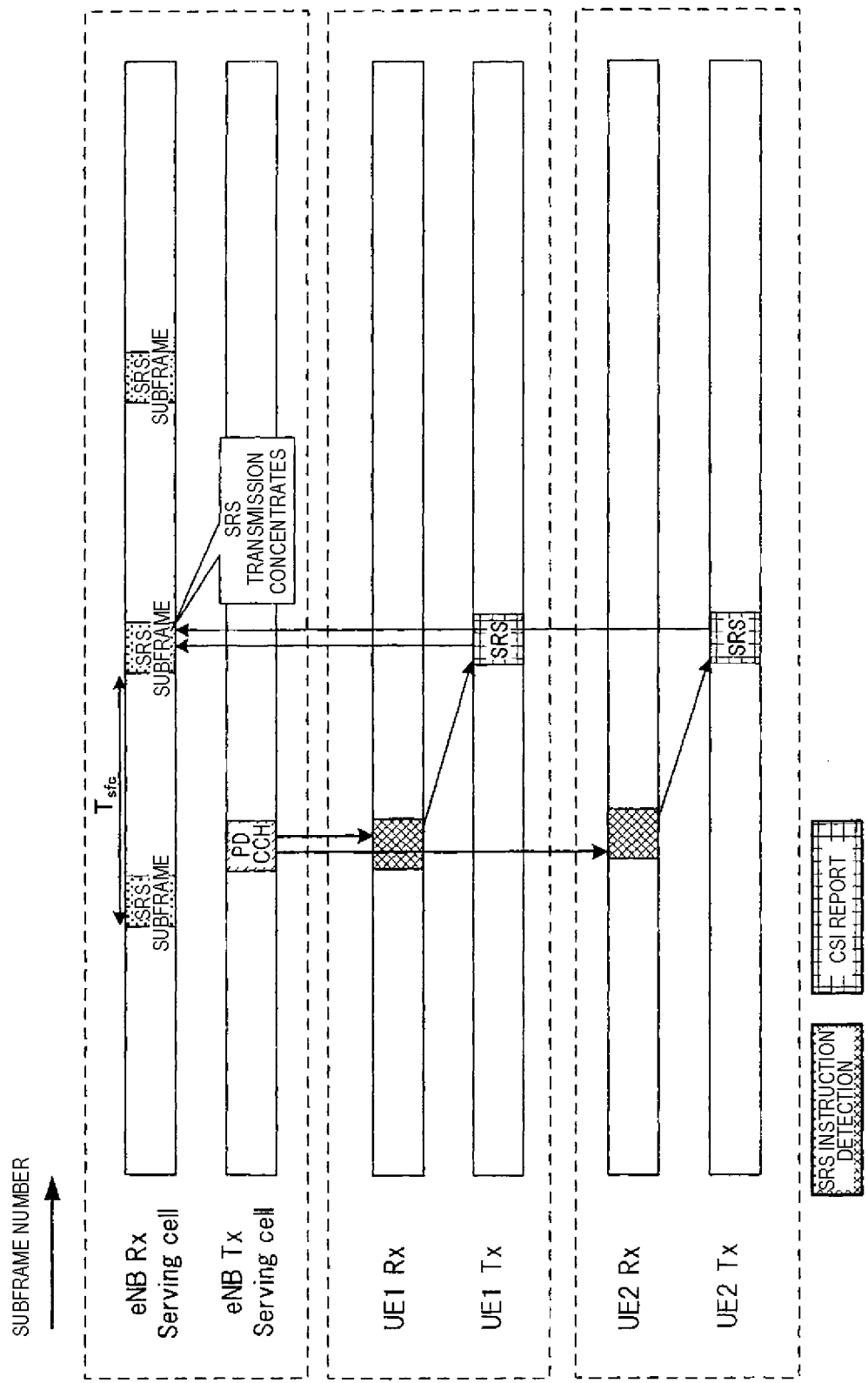
FIG. 32 is an operation explanatory diagram illustrating a problem in an SRS transmission method which sets an SRS subframe only at a specific interval.

Next, the operations of the transmission apparatus and the reception apparatus in the ninth embodiment will be described supplementally. FIG. 29 is a diagram showing an operation relating to SRS instruction and SRS transmission in the ninth embodiment. Description will be mainly provided focusing on portions different from the seventh embodiment, and description of the same portions will be omitted. A reception apparatus UE which meets the SRS instruction determines the SRS transmission timing from the subframe in which PDCCH including the SRS instruction is detected and the reference value of the SRS transmission timing corresponding to the residual data quantity notified previously, and specifies a subframe in which the own apparatus transmits SRS.

In the example of FIG. 29, the reception apparatus UE2 starts the DRX operation after 2 subframes from the transmission timing of the SRS instruction. SRS is transmitted to the transmission apparatus eNB using an SRS subframe immediately after the time of the DRX cycle elapses from the number of subframes of the predefined report interval. With the above-described operation, from the viewpoint of the transmission apparatus eNB, it is possible to distribute the resource of the uplink data channel PUSCH which is allocated as SRS transmission.

As described above, in the ninth embodiment, SRS is transmitted from each reception apparatus to the transmission apparatus at the timing delayed by the delay amount based on the status of the DRX operation after the predefined report interval from the transmission timing of the SRS instruction. Thus, it is possible to suppress concentration of SRS transmission at specific resources in the time domain and to prevent degradation in throughput. In the reception apparatus UE immediately after returning from the DRX operation, errors in the uplink transmission timing can be easily corrected. Although an operation example has been described where the length of the DRX cycle based on the DRX status is used, the invention is not limited thereto. For example, SRS transmission timing control may be performed using a gap period based on the status of a measurement gap operation set for measurement at different frequencies, which is shared by the transmission apparatus and the reception apparatus.

In the ninth embodiment, as in the first embodiment, the timing at which an SRS instruction is transmitted may be distributed at the timing before the SRS transmission subframe by $n_{srs}$ or at the earlier timing, and SRS may be transmitted at the timing delayed by the delay amount based on the status of the DRX operation after the predefined report interval. Thus, the timing at which the SRS instruction is transmitted and SRS transmission can be respectively distributed, thereby suppressing concentration of SRS instructions and SRS transmission at specific resources in the time domain and preventing degradation in throughput. As in the seventh embodiment, when the received quality is satisfactory and signal energy necessary for an SRS instruction in UE belonging to the relevant base station, or the like, is not necessary to distribute the timing at which an SRS instruction is transmitted, and only distribution of SRS transmission may be performed.

Although an example has been described where the serving cell and the target cell are different base station apparatuses, the invention is not limited thereto, and the serving cell and the target cell may be operated as a plurality of cells in the same base station apparatus.

Various changes or applications may be made to the invention on the basis of the description of the specification and known techniques without departing from the spirit and scope of the invention, and fall into the scope of the appended claims. The constituent elements in the foregoing embodiments may be combined in various ways without departing from the spirit of the invention.

Although in the foregoing embodiments, description has been provided as to the antennas, the invention may also be applied to antenna ports. An antenna port refers to a logical antenna which is constituted by one or a plurality of physical antennas. That is, an antenna port is not limited to referring to one physical antenna, and may refer to an array antenna or the like having a plurality of antennas. For example, in LTE, while how many physical antennas constitute an antenna port is not defined, an antenna port is defined as the minimum unit such that a base station can transmit different reference signals. An antenna port may be defined as the minimum unit for multiplying the weight of a precoding vector.

Although a case has been described with the foregoing embodiments as an example where the invention is implemented with hardware, the invention can be implemented with software.

Each function block employed in the description of each of the aforementioned embodiments may be typically implemented as an LSI constituted by an integrated circuit. These may be individual chips or partially or totally contained on a single chip. LSI is adopted here but this may also be referred to as IC, system LSI, super LSI, or ultra LSI depending on differing extents of integration.

The method of circuit integration is not limited to LSI, and implementation using dedicated circuitry or general purpose processors is also possible. After LSI manufacture, the utilization of an FPGA (Field Programmable Gate Array) or a reconfigurable processor where connections and settings of circuit cells in an LSI can be reconfigured is also possible.

With the advancement of semiconductor technology or other derivative technologies, if an integrated circuit technology comes out to replace LSI, it is naturally also possible to perform function block integration using this technology. The application of biotechnology is also possible.

This application is based on Japanese Patent Application No. 2009-133133, filed on Jun. 2, 2009, Japanese Patent Application No. 2009-254160, filed on Nov. 5, 2009, and Japanese Patent Application No. 2010-030237, filed on Feb. 15, 2010, the contents of which are incorporated herein by reference.

INDUSTRIAL APPLICABILITY

The invention has an advantage of suppressing concentration of channel quality information requests and reports at the time of discontinuously transmitting reference signals at specific resources in a time domain and preventing degradation in throughput, and is useful as a wireless communication apparatus, a wireless communication method, and the like which can be applied to a wireless communication system, such as a cellular system.

REFERENCE SIGNS LIST

131*m*, 131*n*: user equipment transmission signal processor
132: encoder/modulator 133: precoding processor
134a to 134d, 134e to 134h: transmission RF section
135a to 135d, 135e to 135h: antenna
136, 436: scheduler
137, 637, 937, 1237: CSI request setting section
138, 1238: CSI-RS generator
139: LTE 4RS generator
140, 440: CSI report interval setting section
141: downlink control signal generator
151m, 151n: user equipment reception signal processor
152: reception RF section
153: separator
154: CSI report demodulator
211a, 211b: antenna
212a, 212b: reception RF section
213: channel estimator
214: CSI calculator
215: MIMO demodulator
216: CSI request detector
217: decoder
218: CRC checker
219, 719, 1019, 1319: feedback information generator
220: encoder
221: multiplexer
222: transmission RF section
642: CSI report offset setting section
723: CSI report offset detector
942, 1244, 1544: CSI report offset setting section
943: user equipment identification information storage section
1024, 1326, 1626: CSI report offset setting section
1245, 1545: path-loss information storage section
1255, 1555: path-loss information demodulator
1325, 1625: RSRP calculator
1627: RSRP comparator
1921: SRS subframe setting section
1922, 2322, 2722: SRS instruction setting section
1923: residual data quantity storage section
1924: SRS detector
2141: SRS instruction detector
2142, 2442, 2842: SRS transmission timing detector
2143, 2443: SRS generator
2323: surplus transmission power storage section
2723: DRX status manager
2851: DRX controller

The invention claimed is:

1. An integrated circuit to control a process, the process comprising:
    transmitting, to a terminal, a request signal for requesting a transmission of a signal; and
    receiving the signal, which is transmitted from the terminal in a subframe which is configured to be specific for the terminal among a plurality of terminals and which is one among a plurality of subframes, the plurality of subframes being common to the plurality of terminals and being configured using a value common to the plurality of terminals,
    wherein the receiving includes receiving of the signal, which is transmitted with a period that is specific for the terminal among the plurality of terminals, the period being from a detection of the request signal to a transmission of the signal at the terminal.

2. The integrated circuit according to claim 1, comprising:
    circuitry which, in operation, controls the process;
    at least one input coupled to the circuitry, wherein the at least one input, in operation, inputs data; and
    at least one output coupled to the circuitry, wherein the at least one output, in operation, outputs data.

3. The integrated circuit according to claim 1, wherein the receiving includes receiving of the signal, which is transmitted at a time that is specific for the terminal among the plurality of terminals.

4. The integrated circuit according to claim 1, wherein the receiving includes receiving of the signal transmitted in the subframe after a defined number of subframes or more from a detection of the request signal at the terminal.

5. The integrated circuit according to claim 4, wherein the defined number of subframes is configured to be common for the plurality of terminals.

6. The integrated circuit according to claim 1, wherein the transmitting includes transmitting of the request signal at a time that is specific for the terminal among the plurality of terminals.

7. The integrated circuit according to claim 1, wherein the transmitting includes transmitting of the request signal on a control channel.

8. The integrated circuit according to claim 1, wherein the transmitting includes transmitting, to the terminal, of a first information indicating the plurality of subframes configured using the value that is common to the plurality of terminals and a second information indicating the subframe configured to be specific for the terminal.

9. The integrated circuit according to claim 1, wherein the subframes configured using the value that is common to the plurality of terminals and the subframe configured to be specific for the terminal are configured using a period represented by a number of subframes.

10. The integrated circuit according to claim 1, wherein the subframes configured using the value that is common to the plurality of terminals are subframes configured to be specific for a cell.

11. The integrated circuit according to claim 1, wherein the signal is a sounding reference signal.

12. The integrated circuit according to claim 1, wherein the signal is a signal indicating channel quality.

13. The integrated circuit according to claim 11, wherein the transmitting includes transmitting, to the terminal, of a reference signal with a period, which is represented by a number of subframes, and said reception section receives the signal indicating channel quality, which is computed based on the reference signal at the terminal.

14. The integrated circuit according to claim 13, wherein the reference signal is used for a communication system compatible with 8 antennas.

15. The integrated circuit according to claim 13, wherein the reference signal is a CSI reference signal.

16. The integrated circuit according to claim 2, wherein the at least one output and the at least one input, in operation, are coupled to an antenna.

17. An integrated circuit comprising circuitry, which, in operation:
    controls transmission, to a terminal, of a request signal for requesting a transmission of a signal; and
    controls reception of the signal, which is transmitted from the terminal in a subframe which is configured to be specific for the terminal among a plurality of terminals and which is one among a plurality of subframes, the plurality of subframes being common to the plurality of terminals and being configured using a value common to the plurality of terminals,
    wherein the receiving includes receiving of the signal, which is transmitted with a period that is specific for the terminal among the plurality of terminals, the period being from a detection of the request signal to a transmission of the signal at the terminal.

18. The integrated circuit according to claim 17, comprising:
- at least one input coupled to the circuitry, wherein the at least one input, in operation, inputs data; and
- at least one output coupled to the circuitry, wherein the at least one output, in operation, outputs data.

19. The integrated circuit according to claim 18, wherein the at least one output and the at least one input, in operation, are coupled to an antenna.

20. A communication device comprising:
- a transmitter, which, in operation, transmits, to a terminal, of a request signal for requesting a transmission of a signal; and
- a receiver, which, in operation, receives the signal, which is transmitted from the terminal in a subframe which is configured to be specific for the terminal among a plurality of terminals and which is one among a plurality of subframes, the plurality of subframes being common to the plurality of terminals and being configured using a value common to the plurality of terminals,
- wherein the receiving includes receiving of the signal, which is transmitted with a period that is specific for the terminal among the plurality of terminals, the period being from a detection of the request signal to a transmission of the signal at the terminal.

* * * * *